US005625803A

United States Patent [19]
McNelly et al.

[11] Patent Number: 5,625,803
[45] Date of Patent: Apr. 29, 1997

[54] SLEW RATE BASED POWER USAGE SIMULATION AND METHOD

[75] Inventors: Andrew J. McNelly, San Jose; Michael R. Grossman, Mountain View; Harish K. Sarin; Bruce S. Seiler, both of Fremont; Michael N. Misheloff, Dublin, all of Calif.

[73] Assignee: VLSI Technology, Inc., San Jose, Calif.

[21] Appl. No.: 357,843

[22] Filed: Dec. 14, 1994

[51] Int. Cl.$^6$ .................................................. G06F 19/00
[52] U.S. Cl. ........................... 395/500; 364/488; 364/490; 364/578
[58] Field of Search ..................................... 395/500, 488, 395/489, 490, 491, 578, 492, 495

[56] References Cited

U.S. PATENT DOCUMENTS

| | | | |
|---|---|---|---|
| 4,698,760 | 10/1987 | Lembach et al. | 364/490 |
| 5,274,568 | 12/1993 | Blinne et al. | 364/489 |
| 5,396,615 | 3/1995 | Tani | 395/500 |
| 5,400,270 | 3/1995 | Fukui et al. | 364/578 |
| 5,426,591 | 6/1995 | Ginetti et al. | 364/489 |
| 5,446,676 | 8/1995 | Huang et al. | 364/578 |
| 5,452,225 | 9/1995 | Hammer | 364/488 |
| 5,473,548 | 12/1995 | Omori et al. | 364/489 |
| 5,481,469 | 1/1996 | Brasen et al. | 364/483 |
| 5,487,018 | 1/1996 | Loos et al. | 364/489 |

FOREIGN PATENT DOCUMENTS

| | | |
|---|---|---|
| 582918A2 | 7/1993 | European Pat. Off. . |
| WO93/18468 | 9/1993 | WIPO . |

OTHER PUBLICATIONS

Chan et al., "Managing IC Power Needs", High Performance Systems, Apr. 1990, pp. 69–74.
Apr. 19, 1996 PCT Search Report.

*Primary Examiner*—Kevin J. Teska
*Assistant Examiner*—Tan Q. Nguyen
*Attorney, Agent, or Firm*—Flehr Hohbach Test Albritton & Herbert, LLP

[57] ABSTRACT

A power usage simulator generates, for all the logic cells in a circuit cell library, a power model that characterizes a cell's power consumption behavior as a two-part, piecewise-linear function based on signal slew rates and output load. A logic simulator is modified so that for each signal transition in a specified logic circuit, the logic simulator performs a power usage computation utilizing the power usage model for all cells affected by each signal transition. The power usage value for each signal transition is posted to a power usage output data structure, with each posted power usage value having an associated time value. The posted power usage values are then analyzed by (A) accumulating the posted power usage values to provide a total power usage value, and (B) clocking the accumulation of power usage values with an end user set clock rate so as to produce a power usage profile indicating the time varying rate of power consumption during the simulation time period. The clocked accumulation of power usage enables easy detection of whether the peak rate of power consumption during the simulation time exceeds a specified threshold (e.g., a threshold associated with a particular power bus design). Thus, data generated by the power usage simulation may be used, either directly or indirectly to determine that the simulated logic circuit requires a larger power bus design, or that the logic circuit should be modified so as to reduce its peak power usage rate.

13 Claims, 8 Drawing Sheets

SLEW RATE BASED POWER USAGE SIMULATION AND METHOD

The present invention relates generally to circuit simulation products and methods, and particularly to products and methods for accurately simulating power usage by large scale integrated circuits.

BACKGROUND OF THE INVENTION

Power consumption is increasingly a subject of concern to integrated circuit designers. Accurate prediction of an integrated circuit's power consumption is important for selection of the proper packaging for the integrated circuit, battery life prediction when the circuit is to be used in a portable or other battery powered device, and chip lifetime prediction. In addition, power consumption prediction can be used to determine the type of heat sink resources needed, if any, for an integrated circuit, since uncompensated thermal effects can lead to performance degradation and chip failure.

Power consumption predictions are also important for designing a proper power distribution network within an integrated circuit. For instance, power busses for an integrated circuit must be sized so as to be able to handle both average and peak current densities, and also to provide sufficient voltage levels to those circuits farthest from the power bus. A power bus, or a power strap to a particular module or section of an integrated circuit may be sufficiently large to handle the maximum sustained power usage expected of a chip, thereby providing sufficient voltage for operation of all portions of the circuit and preventing the power bus from being damaged or destroyed by the buildup of excess heat, while still being insufficiently large to prevent metal migration caused by short current spikes. Thus, it is important to accurately predict both average and peak current usage by an entire integrated circuit and also by portions of the integrated circuit having separate power straps.

Power consumption occurs dynamically (AC)—resulting from the switching of a signal from one voltage level to another, and statically (DC)—when the circuit is "quiet" due to pullups and pulldowns, level shifters, and leakage currents. Most dynamic power consumption is the result of charging and discharging of capacitances in the circuit. Capacitances include pin capacitances, transistor capacitances, and interconnect capacitances. The amount of power consumed by capacitance charging and discharging is represented by the following equation:

$$Power = Capacitance \times Voltage\text{-}Swing^2 \times Frequency$$

Dynamic power consumption is also caused by short circuit current, such as the short circuit current that occurs in CMOS inverters for slow ramp signals.

Prior to the present invention, power consumption simulation methods have generally used either (A) power consumption models based upon average switching frequency estimate formulas and prototype evaluation, and (B) analog circuit simulation techniques. Power consumption simulations based upon average switching frequency estimate formulas and prototype evaluation can be used to estimate the power usage of large circuits, but are too inaccurate to be used as the basis for designing an integrated circuit's power network or to accurately analyze tradeoffs (e.g., power usage, speed, and circuit size tradeoffs) between alternate circuit designs. Analog circuit simulation techniques used to determine power usage by proposed circuits are very accurate but use so much computer resources that the simulation of large circuits with hundreds of thousands of logic gates is either impossible or impractical.

A prior logic circuit simulator by Compass, QSIM, included an "unreleased" version of a power simulator, which assigned an average power usage value to each input and output port of each circuit cell, and then during simulation of the operation of the circuit posted a power usage of the assigned amount whenever a signal transition was determined to have occurred on each cell input port. Thus, the prior QSIM power simulation product computed power usage without taking into account the slew rate of the signal on a cell's input port, the logic state of the cell and static power usage. This prior QSIM power simulation product accumulated total power usage for a specified simulation time, but did not provide the tools necessary to detect peak power usage, to perform hierarchical power analyses, and other power usage analyses desired by circuit designers.

It is a goal of the present invention to provide an accurate integrated circuit power consumption analysis tool to provide the designers of ASICs the information needed to make well informed design decisions and evaluate trade-offs.

It is another goal of the present invention to be able to accurately model the power usage of entire submicron ASIC designs having 200,000 logic gates and more.

Another goal of the present invention is to provide a hierarchical analysis capability, allowing the evaluation of power bus widths, design partitioning, clock gating strategies, asynchronous designs, and power bus gating to circuit blocks.

Another goal of the present invention is to provide both AC and DC power consumption analysis, average and peak power consumption analyses, analyses of the dependency of power consumption on input slew rates, output loads, power supply level and temperature, and to provide best, typical and worst case power consumption analyses.

Yet another goal of the present invention is to provide power consumption analyses with simulation execution speeds significantly better than would be possible using an analog circuit simulator.

Finally, it is a goal of the present invention to support the power usage simulation of integrated circuits having multiple power supplies, and to support power usage simulation of integrated circuits using both gate array designs and cell based designs.

SUMMARY OF THE INVENTION

In summary, the present invention is a power usage simulator and method. A power usage model is generated for all the cells in a circuit cell library, where the power model is based on signal slew rates and output load. In particular, the power usage model is aggregated for each library cell so as to provide a power usage computation for each logic cell rather than for each transistor.

A logic simulator is modified so that for each signal transition in a specified logic circuit, the logic simulator performs a power usage computation utilizing the power usage model for all cells affected by each signal transition. The power usage value for each signal transition is posted to a power usage output data structure, with each posted power usage value having an associated time value. The posted power usage values are then analyzed by (A) accumulating the posted power usage values to provide a total power usage value, and (B) clocking the accumulation of power usage values with an end user set clock rate so as to produce a power usage profile indicating the time varying rate of power consumption during the simulation time period. The clocked accumulation of power usage enables easy detection of whether the peak rate of power consumption during the simulation time exceeds a specified threshold (e.g., a threshold associated with a particular power bus design). Thus, data generated by the power usage simulation may be used, either directly or indirectly to determine that the simulated logic circuit requires a larger power bus design, or that the logic circuit should be modified so as to reduce its peak power usage rate.

The present invention is a logic gate level, event driven logic simulator based power simulator. It calculates both dynamic and static power usage. A "power strobe" clock with a user specified clock rate is provided to allow user control of power calculation overhead. The present invention is used in conjunction with a logic simulator, and the simulation of power usage imposes relatively low overhead on the simulation speed of the logic simulator.

The power usage simulator computes power usage as a function of input signal slew rate, output loading, the state each circuit cell having a changing input signal, voltage of the power supply, and temperature. The power usage simulations of the present invention are almost as accurate (within about 5%) of those of an analog circuit simulator when using the input slew rate and internal state based power usage model of the present invention.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

I. BLOCK DIAGRAM

Figure 1:
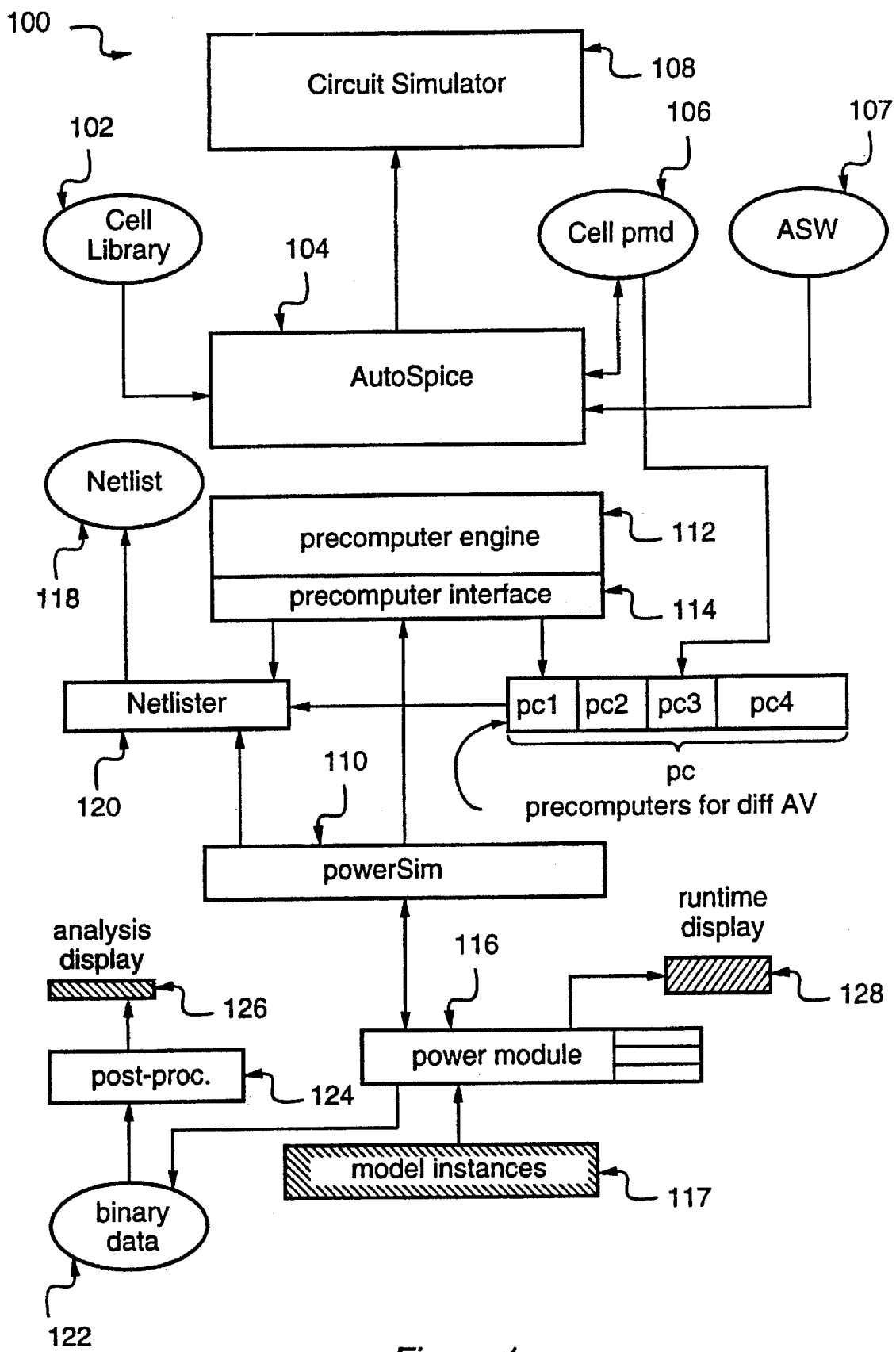
FIG. 1 is a block diagram of a preferred embodiment of the present invention.

Referring to FIG. 1, there is shown a preferred embodiment of a slew-rate based power simulator 100 for application specific integrated circuits (ASICs). The power simulator 100 includes an AutoSpice controller 104 that communicates with a cell library database 102, a circuit simulator 108, a cell primitive module descriptor (PMD) database 106 and an AutoSpice waveform (ASW) file 107. The power simulator 100 also includes a powerSim controller 110 that interfaces with a precomputer interface 114, a Netlister 120 and a power module 116. In addition to its interface with the powerSim 110, the precomputer interface 114 has external interfaces with the Netlister 120 and precomputers pc1, pc2, pc3 and pc4, and an internal interface with the precomputer engine 112. The precomputers also communicate with the cell PMD 106. As regards the other elements communicating with the powerSim 110 the Netlister 120 interfaces with a netlist database 118 and the precomputers; the power module 116 interfaces with a runtime display 128, the model instances 117 and a binary data file 122. Finally, a post processor 124 is provided that has interfaces with the binary data file 122 and an analysis display 126. The power simulator 100 utilizes these elements to perform two primary functions, logic cell characterization, coordinated by the AutoSpice 104, and circuit power simulation, performed by the powerSim 110.

Characterization is performed before simulation and involves determining the power behavior of cells in the cell library 102 from which circuit elements making up the ASIC to be simulated are drawn. The characterization process is carried out under the control of AutoSpice 104, which directs interactions between the cell library 102, cell PMD 106, ASW file 107 and circuit simulator 108, the other elements involved in characterization. The cell library 102 is a database that details the transistor-level netlist of the logic cells used by ASIC vendors. The cell PMD 106 is a database that contains high-level information for each cell in the cell library 102 including delay and power characterization coefficients, about which more will be said later. The ASW file 107 defines for each cell waveforms used to excite the cell's inputs during power characterization. The circuit simulator 108 is a transistor-level delay and power simulator, such as HSpice, which models the power consumption behavior of each cell in the cell library 102 based on a transistor level netlist and various input parameters specified by the AutoSpice module 104.

Once the cell library 102 has been characterized, circuit simulation may occur under the control of powerSim 110, which evaluates the ASIC's power consumption behavior in tandem with a gate-level event-driven logic simulation of the ASIC. Besides PowerSim 110, the other elements involved in circuit simulation include the cell PMD 106, the precomputer engine 112, the precomputer interface 114, the precomputers pc1, pc2, pc3 and pc4, the power module 116, the model instances 117, the netlist database 118, the Netlister 120, the binary data file 122, the postprocessor 124, and the analysis and runtime displays 126 and 128.

The precomputer engine 112, when called by powerSim 110, controls the first step of circuit simulation which involves precomputing dynamic and static power factors associated with all of the circuit elements in the circuit being simulated. As the preferred embodiment of the present invention is designed to accommodate cell libraries 102 from different ASIC vendors, the precomputer engine 112 does not perform these calculations directly, but does so by coordinating interactions between the Netlister 120, the precomputer interface 114 and a precomputer pc selected from the set of precomputers pc1, pc2, pc3, pc4, where each of pc1, pc2, pc3 and pc4 correspond to a cell library supplied by a particular ASIC vendor.

The precomputer pc computes the aforementioned static and dynamic power factors for each possible input-output transition and state of a circuit element that can be achieved during ASIC simulation. As each circuit element in the ASIC is an instance of a cell in the cell library 102, the power factors for a circuit element are computed from the power and delay characterization coefficients stored in the corresponding cell's entry in the cell PMD 106. Input slew rate and output load figures for each circuit element, derived by the Netlister 120 and passed to the precomputer pc by the precomputer interface 114, are also used by the precomputer pc in determining power .factors. Note that these PMD power and delay coefficients can be computed by the power simulator 100 as described above or can be precomputed and exported to appropriately-formatted PMDs by ASIC vendors who might not wish to provide proprietary cell library information.

The Netlister 120 has access to the netlist database 118, which describes the cell-level interconnections of the circuit elements within the ASIC to be simulated. The Netlister 120 also communicates with the precomputer interface 114, from which the Netlister 120 receives the power consumption data computed by the precomputer pc. Based on the data from the netlist database 118 and the precomputer interface 114, the Netlister 120 generates a data structure associating power consumption figures (or power factors) with each circuit element (or cell instance) in the netlist 118.

The power module 116 is coupled to the runtime display 128 and model instances 117. The power module 116 handles housekeeping duties required by powerSim 110 including providing an interface to the runtime display 127, maintaining global power figures, and building and managing data structures used for power monitoring by the model instances 117.

The model instances 117, which are coupled to the power module 116, keep track of the static and dynamic power consumed by each circuit element in the course of logic simulation of the ASIC. The model instances 117 are called by the powerSim module 110 and report static and dynamic power figures to the data structures set up by the power module 116. Additionally, the power consumption data reported by the model instances 117 is written by the power module 116 in a compressed form to a binary data file 122 for later processing in the post processor 124 and display via the analysis display 126.

A detailed description of the aforementioned characterization and simulation processes will be provided below, following a description of the power model employed by the power simulator 100. It is this simplified power model that facilitates the accurate and streamlined power simulation offered by the present invention.

II. THE POWER MODEL

Figure 2:
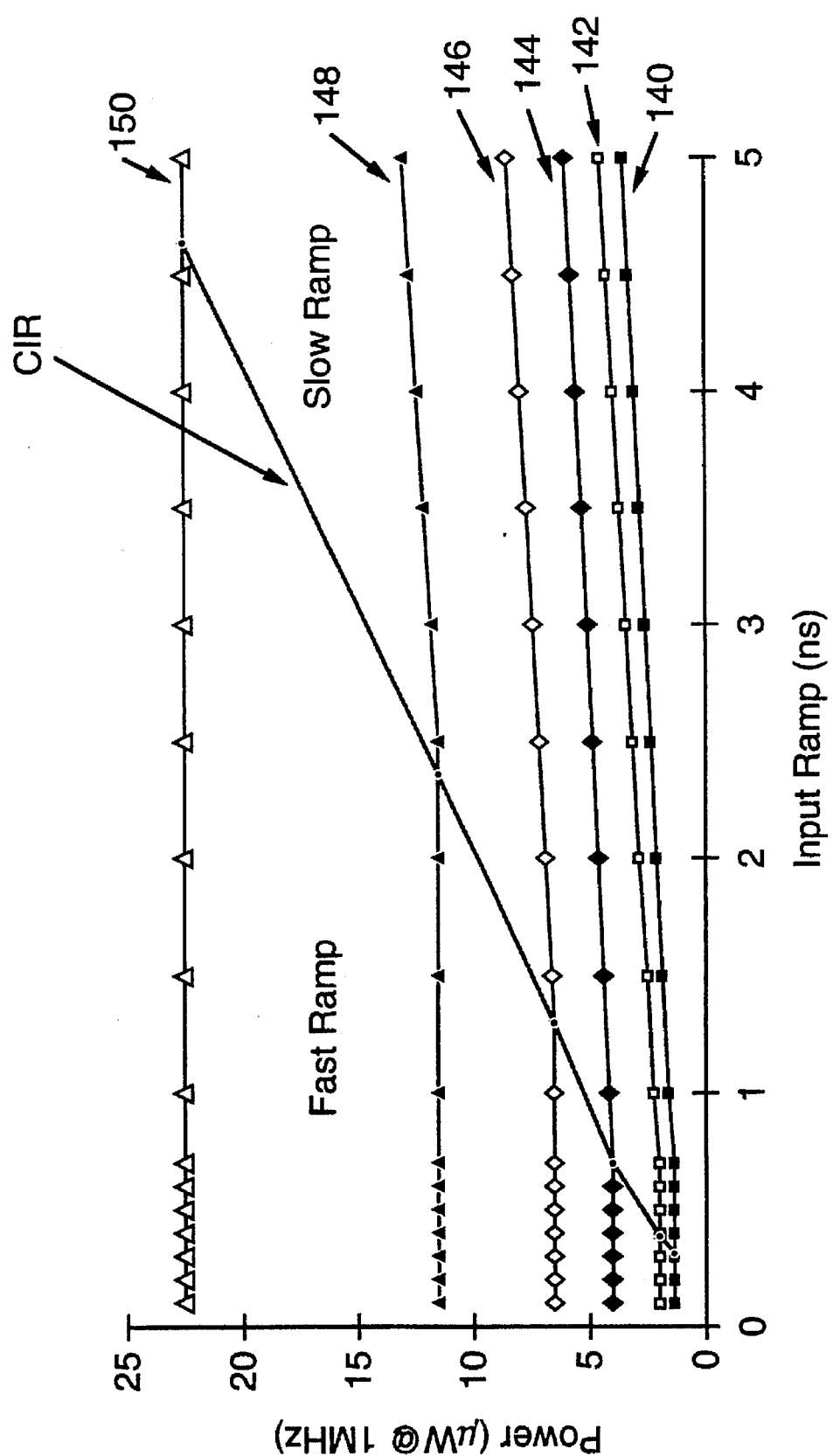
FIG. 2 is a graph of power dissipation in a logic cell versus input slew rate for different output loads.

FIG. 2 is a graph of typical power dissipation behavior in a logic cell as a function of the input ramp (inversely related to slew rate) of a voltage signal applied to the cell's input and the capacitive load driven from the cell's output. Each of the curves 140, 142, 144, 146, 148, and 150 shown in FIG. 2 represents the power dissipated in a logic cell at a fixed output load. While exact capacitive loads are not shown in FIG. 2, each of curves 142, 144, 146, 148 and 150 are associated with loads that are respectively 2X, 4X, 8X, 16X and 32X the value of the base load, which is associated with curve 140. Thus, FIG. 2 illustrates the well known fact that the power dissipated by a logic cell increases with increasing input ramp and output load.

A novel aspect of the present invention is to recognize that the power dissipation behavior of a logic gate exhibits two modes of operation. In the first mode, power dissipation for a fixed output load is relatively independent of the input slew rate. This, for reasons set out below, is called the FAST RAMP region, which is that part of FIG. 2 above and to the left of the line designated as CIR (critical input ramp). In the second mode of operation, the power dissipation behavior for a fixed output load increases for increasing input slew rate. This is called the SLOW RAMP region, and is that part of FIG. 2 below and to the right of the CIR line. The CIR line separating the two regions is found to be a linear function of the output load. The power consumption in the two regions is described by two different functions, one for the FAST RAMP region and the other for the SLOW RAMP region. The functions are equal at the boundary between the regions defined by the CIR line. Significantly, the critical input ramp (CIR) for the power dissipation profile of a logic cell is found to be identical to the CIR for the timing behavior of a logic cell. This last observation proves to be one of the keys to simple and accurate power characterization of logic cells.

The bases of these two modes of operation are easily explained. A logic cell's power consumption behavior lies in the FAST RAMP region when the cell's input slew rate is so fast so that it does not affect the cell's output ramp. When this is the case, the cell's power consumption depends mainly on the current required to drive the output load, which, for the curves 140, 142, 144, 146, 148 and 150, is constant, yielding a power line that is relatively flat in the FAST RAMP region. A logic cell's power curve lies in the SLOW RAMP region when the input ramp of the logic gate is so slow that the cell's output is similarly slowed. As the output ramp is delayed, the cell draws correspondingly more short circuit input current due to both input and output gates being on simultaneously, which explains how power increases with increasing output load in the SLOW RAMP region.

The effect on power dissipation behavior of this coupling between the input ramp and output load is linear. Furthermore, the boundary between the fast ramp region and slow ramp region of power dissipation behavior, the CIR, is found to vary with output load, exhibiting a dependency on the output load identical to that shown by the CIR dependency of timing behavior. As the critical input ramp (CIR) for power consumption behavior is identical to the CIR for timing behavior, additional characterization economy can be gained when both timing and power characterization for the above models are performed simultaneously.

These observations are the key to computationally simple but accurate power characterization. By identifying the regions where logic gate power dissipation is linearly dependent on input ramp and output load, then developing a linear model of power dissipation in those regions, accuracy in power modelling is retained and simplicity is gained by being able to describe a cell's power behavior via a few linear coefficients rather than complex polynomial or transistor-level power models. Thus, the present invention is able to model the power consumption of large circuits at the cell level without a significant loss in accuracy while reducing demands on computing resources used for logic cell power characterization.

A. Power Coefficients

Having described in general terms the power model implemented in the present invention, it remains to describe the power coefficients used to model, or characterize, the power consumption behavior in the slow and fast ramp regions.

One aspect of the present power model is to provide coefficients that characterize the power dissipated by a gate or logic cell as a function of input slew rate at a fixed output load, as is reflected on the curves from FIG. 2. Where the input slew rate is less then the critical input ramp CIR, which is in the FAST RAMP region, the power dissipated is modelled as increasing linearly with the input ramp time, the slope of the line being given by the power model parameter D. Where the input ramp time is greater than the CIR, which is in the SLOW RAMP region, dissipated power is again modelled as increasing linearly with the input ramp time, but with the slope given by the model parameter E. Consistent with actual power behavior, the power dissipated is modelled as being continuous at the CIR. Thus for a fixed output load, the present power model represents power dissipation as two line segments intersecting at the CIR.

The power model of the present invention also accounts for the dependence of dissipated power on output load, which is related to two factors. First, as is clear from FIG. 2, the CIR increases linearly with increasing output load, implying that the breakpoint between the two ramp regions for higher loads occurs for higher values of the input slew rate. This load dependency of the CIR is given by the parameter H, the derivation of which is described below. Second, the power dissipated in a logic cell increases linearly with output load, with a slope given by the parameter B.

Therefore, for cells where the dissipated power is dependent on CIR; e.g., where the cell is a single-stage device having a single drive stage, the power dissipation is given by Eq. 1.

$$P = A + B \cdot Load + D \cdot min(IR, CIR) + E \cdot max(0, IR - CIR) \quad \text{(Eq. 1)}$$

Note that for any logic cell there is a separate set of coefficients A, B, D, E and CIR collectively defining the cell's power dissipation profile for each input voltage pattern set up for that cell by the ASW file 107. This is because the power consumed in a cell depends on the type of signal transitions on the cell's input and output as well as any internal states of the cell, both of which are tied to the pattern of input voltages on the cell's pins.

The final step in completing the model is specifying CIR for each power dissipation profile, which is given by Eq. 2.

$$CIR = G + H \cdot Load \quad \text{(Eq. 2)}$$

G in this expression depends upon:

(1) the delay from the start of the input ramp to the start of the output ramp and the delay from the start of the input ramp to end of the output ramp, and (2) a compensation factor that modifies (1) above due to nonlinearity in the input slope. The need for such a correction arises because of the piecewise linear approximation in which the waveforms are applied during the characterization process. In actual practice, for CMOS and other integrated technologies, the output is not piecewise linear but exhibits a nonlinear behavior. This nonlinearity is observed to be different for rising and falling ramps, as well as for different technologies. This compensation factor needs to be determined only once for a given technology and is independent of the cell's functionality.

Likewise, H depends upon:

(3) how the delay in (1) above varies with output load, and (4) a compensation factor that modifies (3) above due to nonlinearity in the output ramp.

In the preferred embodiment, the CIR coefficients G and H are determined from an ISM delay characterization of each cell in the cell library, which involves simulating and then modelling a cell's timing behavior for different input waveforms at different combinations of input ramp and output load. A large portion of the input waveforms used for ISM delay characterization are a subset of those used for power characterization, hence delay characterization of the cell library 102 can take place before or concurrently with power characterization. Differences in the input waveforms are due to different aspects of a cell's behavior that are of interest in the power or delay realms. For example, in power characterization, the ASW specifies input waveforms that drive the cell into certain internal states so that static power dissipation may be determined. If determined by ISM delay characterization, the coefficients G and H would be stored by the ISM delay simulator into the PMD where they would be accessible to the power simulator 100 for use in computing the power coefficients A, B, D and E.

Additionally, in an alternative embodiment of the present invention, delay characteristics of the library cells 102 may be provided by a non-ISM timing simulator. In this case, the CIR would be determined from the circuit's delay behavior by the AutoSpice module 104 in the course of power characterization.

In the delay characterization process, the CIR is defined by Eq. 3.

$$CIR = \tfrac{1}{2}(DT0 + DT1) \quad \text{(Eq. 3)}$$

In Eq. 3, DT0 is the delay from the start of the input ramp to the start of the output ramp and DT1 is the delay from the start of the input ramp to the end of the output ramp. As with the power model of the present invention, DT0 and DT1 are approximated by piecewise linear functions, set out below respectively as Eq. 4 and Eq. 5, having a knee at the CIR and depending on two variables, input ramp (IR) and output load (Load). Note that the coefficients used below, A0, A1, B, D0 and D1, are not the same as the coefficients A, B and D used to model the power dissipation profiles.

$$DT0 = A0 + D0 \cdot Load + FAT \cdot B \cdot min(IR, CIR) + Z \cdot max(0, IR - CIR) \quad \text{(Eq. 4)}$$

$$DT1 = A1 + D1 \cdot Load + FAT \cdot B \cdot min(IR, CIR) + Z \cdot max(0, IR - CIR) \quad \text{(Eq. 5)}$$

In these equations, FAT is the compensation factor referred to under points G(2) and H(4) above that is precomputed once for each technology, and A1, A0, B, D0 and D1 are delay coefficients that are determined experimentally in the following steps of the delay characterization process:

1. Three circuit delay/timing simulations are executed and DT0 and DT1 are empirically determined at three different combinations of input ramp and output load in the fast ramp region of the timing behavior curves.

2. After substituting the three pairs of DT0 and DT1 times and the three different combinations of IR and Load at which the DT0 and DT1 pairs were measured into Eq. 6 and Eq. 7, the resulting system of equations is solved for A0, A1, B, D0, and D1.

$$DT0 = A0 + D0 \cdot Load + FAT \cdot B \cdot IR \quad \text{(Eq. 6)}$$

$$DT1 = A1 + D1 \cdot Load + FAT \cdot B \cdot IR \quad \text{(Eq. 7)}$$

NOTE: Eq. 6 and Eq. 7 represent a simplification of Eq. 4 and Eq. 5 applicable in the fast ramp region of delay characterization. This simplification is made possible by the fact that, in the fast ramp region, IR is less than CIR, so the max(0, IR−CIR) terms in Eq. 4 and Eq. 5 evaluate to 0.

3. The CIR coefficients G and H described above are then determined by substituting the computed values of the coefficients A0, A1, B, D0, and D1 into Eq. 6 and Eq. 7, setting IR equal to CIR in Eq. 6 and Eq. 7, substituting the resulting expressions for DT0 and DT1 into Eq. 3, solving the resulting equation for CIR, then grouping the coefficients so as to replicate the form of Eq. 2, yielding G and H. These steps are summarized in the following equations:

$$CIR = 1/2(DT0 + DT1) \quad \text{(Eq. 8)}$$

$$CIR = 1/2(A0+A1) + 1/2(D0+D1)\text{Load} + B \cdot FAT \cdot CIR \quad \text{(Eq. 9)}$$

$$CIR = \frac{1/2(A0+A1+(D0+D1)\text{Load})}{1-B \cdot FAT} \quad \text{(Eq. 10)}$$

$$CIR = \frac{1/2(A0+A1)}{1-B \cdot FAT} + \frac{1/2(D0+D1)\text{Load}}{1-B \cdot FAT} \quad \text{(Eq. 11)}$$

with the result that the CIR coefficients G and H are given by the following expressions:

$$G = \frac{A0+A1}{2(1-B \cdot FAT)} \quad \text{(Eq. 12)}$$

$$H = \frac{D0+D1}{2(1-B \cdot FAT)} \quad \text{(Eq. 13)}$$

Thus, G's dependency on the input-output delays as described above is due to the coefficients A0 and A1. G's dependency on the nonlinearity inherent in the circuit is represented by the factor B·FAT. Similarly, H's dependency on output load is represented by the coefficients D0 and D1, and H's dependency on circuit nonlinearities is represented by the same factor as for G, B·FAT.

In an alternative embodiment, the coefficients A0, A1, B, D0, and D1 and the FAT compensation factor are determined for different temperature, process and power supply conditions. The technique for determining these parameters is similar to that set out above, except that additional DT0 and DT1 measurements are required at different combinations of temperature, process and power supply voltage.

As more drive stages are interposed between the input and output of a logic cell, the output begins to decouple from the input. The extent of this decoupling is a function of the intervening drive stages. At some point, the two ramp regions collapse into a single region. I.e., the change at the output is no longer affected by the input and, as a result, the power dissipated is independent of the CIR, eliminating the slow ramp region. Therefore, for multistage devices, for a particular output ramp, dissipated power is modelled as a single straight line wherein dissipated power is linearly dependent on input ramp. This dependency is given by the same coefficient D that appears above, as the output ramp is independent of the input ramp in the fast ramp region. Variances in the output load dependencies taken into account implicitly for single stage devices through the dependencies of CIR on output load are dropped. Instead, for many, but not all, multi-stage devices the power dissipated is found to be bilinear in load; that is, the load parameter B is determined separately for a low load region corresponding to loads less than the LOAD LINE shown in FIG. 3, and a high load region corresponding to loads greater than the LOAD LINE. Thus, for multi-stage devices, the power model is given by Eq. 14.

$$P = A + B \cdot \text{Load} + D \cdot IR \quad \text{(Eq. 14)}$$

B. Steps of Power Characterization

Power Characterization as performed by the preferred embodiment consists of three basic steps. First, based on transistor-level delay and logic simulations of each cell in the cell library 102, for each cell CIR coefficients are computed corresponding to each input voltage pattern on the cell's pins. Second, for library cells that are single stage devices, power dissipation is modelled at different combinations of input slew rates and output loads, then, using the CIR computed in step 1, characterized according to the piecewise linear model presented above. Third, for library cells that are multi-stage devices, power dissipation is modelled at different input ramps and output loads, then characterized according to the straight line power dissipation model described above. Detailed descriptions of these characterization steps follow.

1. Preliminaries

Prior to power characterization, the following cell characteristics are obtained and stored in the PMD entry of each cell to be characterized: logic behavior, input ramp and output load dependency of timing behavior, and pin information. As with the power dissipation measurements to be made later in the characterization process, the timing measurements in the PMD106 are obtained through the use of a circuit simulator such as HSpice.

If an ISM delay characterization were previously run on the cell library 102, precomputed delay coefficients A0, A1, B, D0, D1 and FAT used to compute the CIR coefficients G and H would be available in the PMD for each pin-pair transition that occurs for a given set of states on the other pins of the cell. For example, if the cell being characterized is a two input AND gate and a transition of interest involves a low to high transition on one of the input pins and a corresponding low to high transition on the output pin, the state on the other pins is defined by the non-varying, high voltage on the other input pin.

If an ISM delay characterization were not run on the cell library 102, the compensation factor FAT needed by the power simulator 100 to determine the CIR coefficients G and H would be accessible from a technology file providing compensation factor values for each defined cell library. The delay coefficients would not be available in the PMD. In this case, the power simulator would run the delay characterization, and store a pair of the CIR coefficients, G and H, into the PMD for each pin-pair transition and state of the cell to be characterized as described above.

The states and pin-pair transitions for which the CIR is calculated are determined by the AutoSpice waveform (ASW) file 107, which, among other things, defines a piecewise linear waveform that excites the cell's input pins and brings the cell to a desired state. The ASW also specifies all pin states under which power consumed by the cell is to be measured, as well as a time interval over which the cell's power dissipation is to be integrated upon. Finally, the ASW uniquely identifies the nodes (e.g., voltage sources) in the cell at which the currents need to be monitored to determine an accurate measure of the power dissipated in each characterization pass, and sets out a temperature, process, and power supply at which the cell library is to be characterized.

2. Power Characterization of Single Stage Devices

Figure 3:
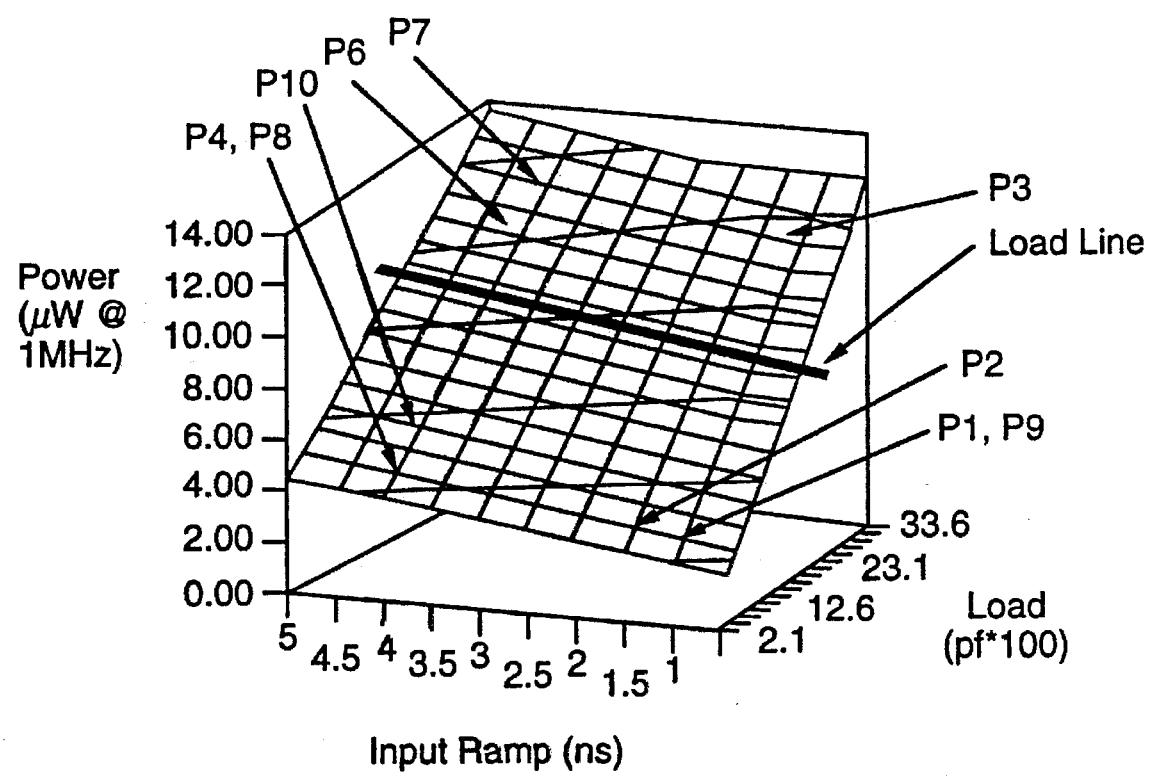
FIG. 3 is a surface plot showing power dissipation in a logic cell as a function of input slew rate and output load.

For single stage devices, power dissipation behavior is approximated by the piecewise linear model set out above in Eq. 1 and Eq. 2. Computing the coefficients A, B, D and E used in this model requires that power dissipation measurements P1, P2, P3 and P4 be modelled at particular combinations of input ramps and output loads as shown in FIG. 3. The power measurements and their corresponding input ramps and output loads are described below:

P1: dissipated power corresponding to a fast input slew rate (IR1) and low output load (Load1).

P2: dissipated power for the same low output load (Load1) and another slew rate (IR2) in the fast region.

P3: dissipated power (P3) corresponding to the first fast input slew rate (IR1), and a high output load (Load3).

P4: dissipated power at a low load (Load4) and slow input slew rate (IR4).

The power values P1, P2, P3 and P4 are then used to determine the characterization parameters D, B and A and E according to the following equations:

$$D = \frac{P2 - P1}{IR2 - IR1} \quad \text{(Eq. 15)}$$

$$B = \frac{P3 - P1}{LOAD3 - LOAD1} \quad \text{(Eq. 16)}$$

$$A = P3 - B \cdot Load3 - D \cdot IR1 \quad \text{(Eq. 17)}$$

$$E = \frac{(P4 - P1) - D \cdot CIR}{(IR4 - CIR)} \quad \text{(Eq. 18)}$$

where CIR is computed according to Eq. 19.

$$CIR = G + H \cdot Load4 \quad \text{(Eq. 19)}$$

Once determined, the values of these coefficients are stored in the PMD, indexed by pin-pair transition, signals on the other external pins of the cell, and internal state of the cell, if applicable, and characterization is repeated, either for the next input waveform specified in the ASW for the same cell, or for the next cell to be characterized.

Note, the power behavior of a single stage device in response to a rising input, falling output pin-pair transition is dominated by crowbar currents. In these cases, the FAST RAMP power term becomes negligible; i.e., FAST RAMP coefficients A, B and D go to zero, and only the SLOW RAMP coefficient E is computed.

Additionally, cells having Vdd and Vcc pins can be characterized as set out above. However, duration of voltage is not known for mixed-voltage devices and hence, is not supported in the preferred embodiment.

3. Power Characterization of Multi-Stage Devices

Even though the power dissipation of multi-stage devices is modelled as a single line having the general equation shown in Eq. 14, two different sets of coefficients A, B and D are computed based on whether the cell's output load is in the high or low load region. In the high load region, these coefficients are called Ahigh, Bhigh and Dhigh, and in the low, Alow, Blow and Dlow. In either region, the coefficients are determined by the same procedure. First, a cell's power dissipation is simulated for different combinations of output load and input slew rate, all of the loads being in the high load or low load region, depending on the region being characterized. Second, the modelled powers and corresponding input slew rate and output load are substituted into Eq. 14. Third, the resulting simultaneous equations are solved to determine the characterization parameters Alow, Blow, and Dlow for the low load region and Ahigh, Bhigh, and Dhigh for the high load region.

The power dissipation measurements to be modelled are shown in FIG. 3. In the high load region, the powers modelled are:

P5: dissipated power at a high load (Load5) and low input slew rate (IR5),

P6: dissipated power at a different high load (Load6) and a high input slew rate (IR6), and P7: dissipated power at Load5 and IR6.

In the low load region, the powers modelled are:

P8: dissipated power at a low load (Load8) and high input slew rate (IR6),

P9: dissipated power at a different low load (Load9) and a low input slew rate (IR5), and P10: dissipated power at Load9 and IR6.

III. POWER SIMULATOR FLOW

Figure 4:
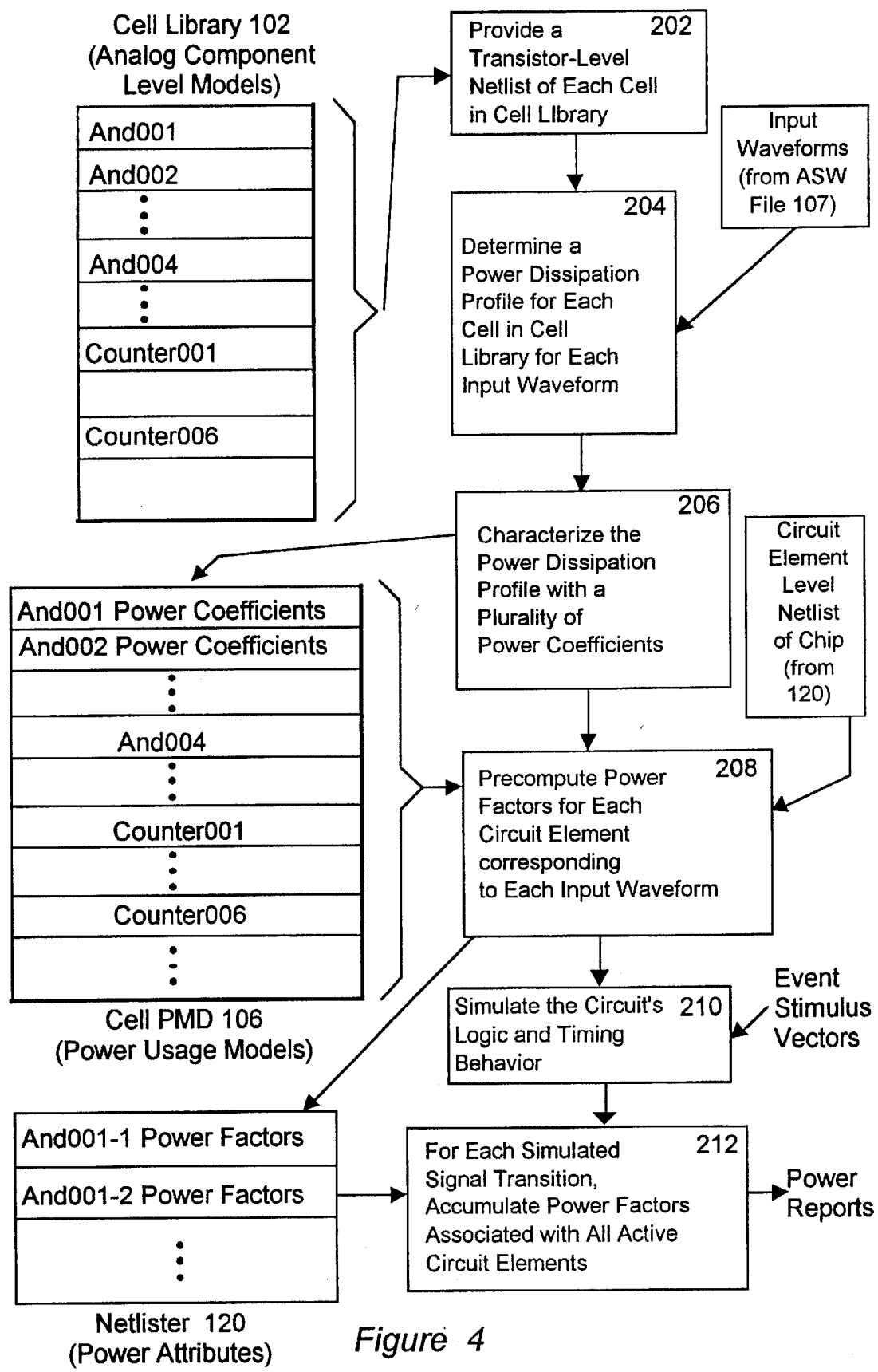
FIG. 4 is a flow chart diagram for the process of cell characterization and circuit power simulation.

FIG. 4 shows the steps involved in library characterization and circuit simulation performed by the preferred embodiment of the present invention. The steps for characterizing the library are:

1) step 202, providing a transistor-level netlist of each cell in the cell library 102, 2) step 204, determining a power dissipation profile for each cell in the cell library 102 for each input waveform specified in the ASW file 107, and 3) step 206, characterizing all power dissipation profiles with a plurality of power coefficients.

These library characterization steps can be executed independently of the steps of circuit power simulation, which are:

4) step 208, precomputing power factors for each circuit element corresponding to each input waveform based on the power coefficients in the PMD 106 and the specific input ramps and output loads of circuit elements provided by the Netlister 120, 5) step 210, simulating the circuit's logic and timing behavior in response to event stimulus vectors, and 6) step 212, accumulating power factors associated with circuit elements activated or otherwise consuming power due to the events triggered by the event stimulus vectors.

Figure 6:
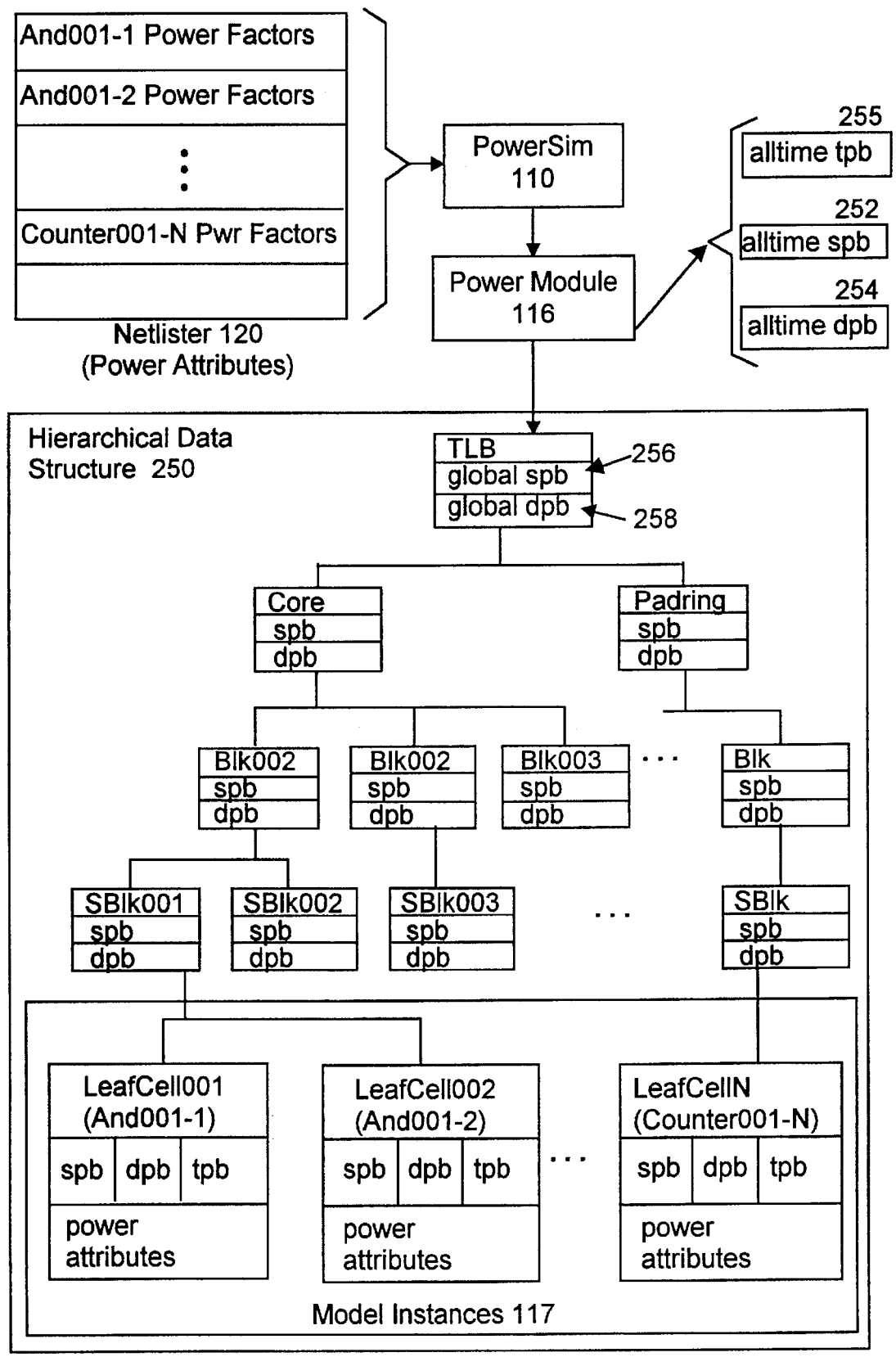
FIG. 6 shows the hierarchical data structures used in the power simulation process.
Figure 8:
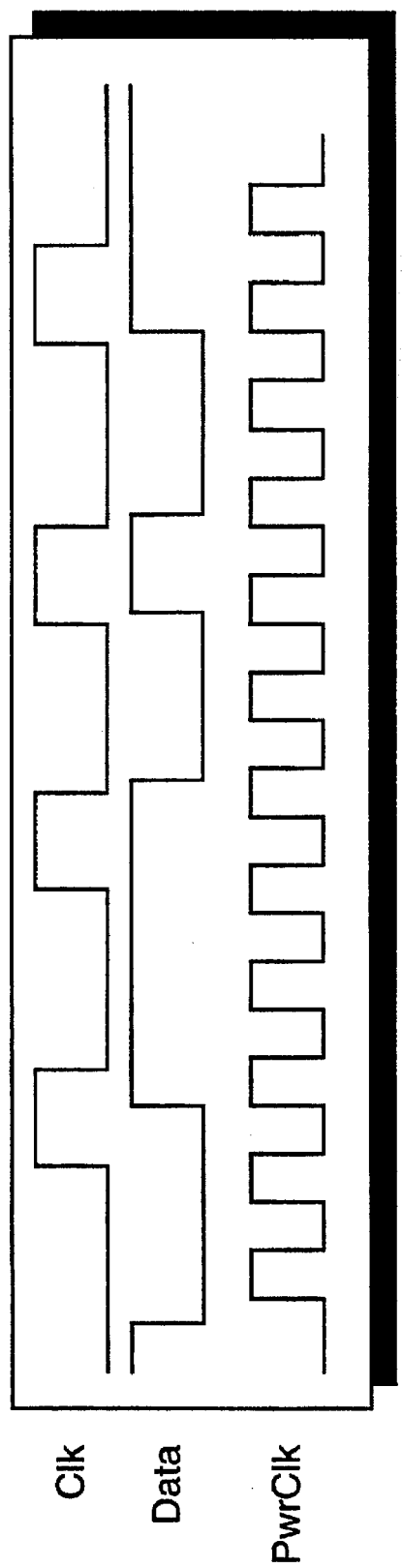
FIG. 8 shows a sample power histogram display.
Figure 8:
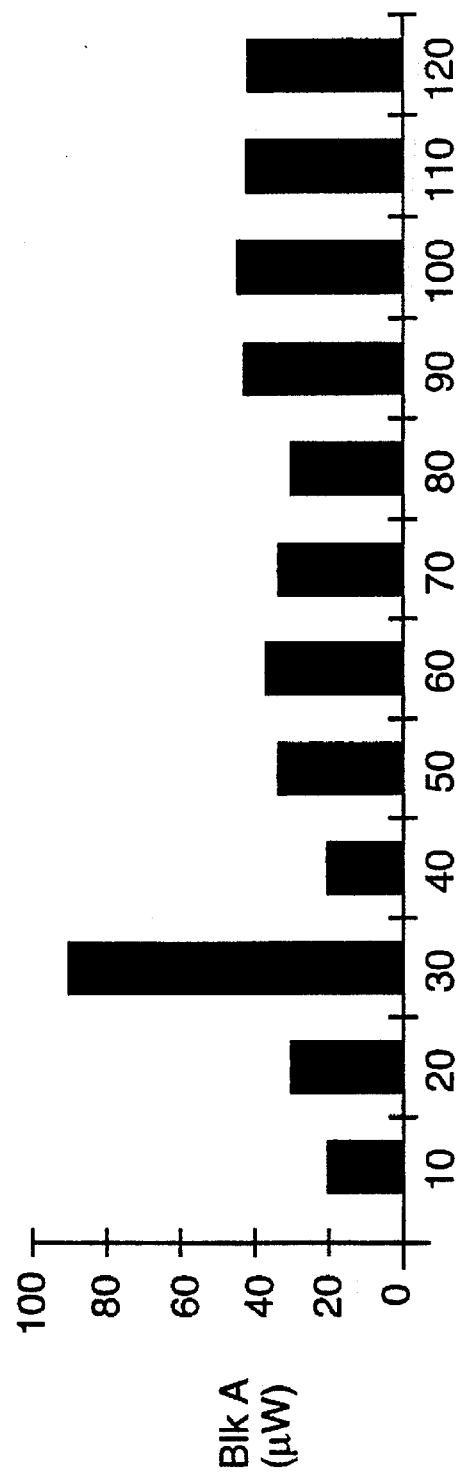

In addition to the step-oriented approach of FIG. 4, FIGS. 6 and 8 depict a dataflow-oriented view of the library characterization and circuit power simulation processes. These figures and the simulator block diagram from FIG. 1 can be consulted in conjunction with the following descriptions of these two processes, which are keyed to the steps in FIG. 4.

A. Database Descriptions

The data used and generated in the characterization process are stored in three databases, the cell library 102, ASW file 107 and cell PMD 106, details of which are shown for a hypothetical cell, denoted "Cell001," in Appendix 1. The cell library 102 holds in static storage information pertaining to the transistor-level netlist, or analog component level models, of each cell in the cell library 102. The cell PMD 106, which is also implemented in static storage, has one entry for each cell in the cell library 102 and in the preferred embodiment initially holds timing data from an ISM delay characterization previously run on each cell and CIR coefficients G and H (which are computed from the timing runs as set out above). The ASW file 107 specifies for each cell a piecewise-linear input waveform, and process, temperature and power supply settings for which each cell's power dissipation behavior is to be characterized by the AutoSpice program 104. Generally, there is a loose connection between PMD entries and ASW file entries.

1. ASW File

Each cell's ASW is designed to exercise the cell so that those power-dissipating input-output transitions and internal states of the cell accounting for the most significant contributions to power usage are evaluated. Thus, input ASW waveforms are specified so as to stimulate each cell through a set of dynamic transitions identical to those characterized in the aforementioned ISM delay characterization process. The ASW also specifies the time interval over which the power consumption is to be determined and uniquely identifies the nodes (i.e., voltage sources) in the cell at which current needs to be monitored to determine an accurate measure of the power consumed by each characterization pass. Additionally, the ASW waveforms are designed to allow static power dissipation to be determined for certain types of cells (e.g., tristate devices pulled high) and dynamic power dissipation for "nochange" transitions (when a cell input changes but the output does not). These static waveforms are only included in the ASW where the static power consumed by a cell is significant. Environmental parameters are also specified in the ASW, including temperature, power supply and process. These parameters are used in the power simulator to scale power coefficients and power factors when a user of PowerSim 110 specifies conditions that differ from the baseline conditions specified in the PMD 106.

2. Cell PMD

While the ASW file 107 determines which transitions and states occur for any given cell, the delay and power characterization data in the PMD 106 are not indexed by the ASW inputs, but by the transitions at the cell's output generated by input transitions, the non-varying voltages on other pins of the cell, and any internal states of the cell, if relevant (e.g., where static power consumption is of interest). The power section of the cell PMD 106 stores the power coefficients generated in the course of the characterization process. To comprehensively represent the data collected, the PMD's power section can account for all of the possible external inputs and internal states of a cell for which dynamic and/or static power is consumed, but normally only those power-dissipating input-output transitions and internal states of the cell accounting for the most significant contributions to power usage are represented in the PMD power section. The structure of the PMD must also serve the needs of the precomputer 112, which uses the power coefficients stored in the PMD to compute power consumption figures for each cell instance in the logic component level circuit netlist during simulation.

Appendix 1 shows the structure of the PMD power section for a hypothetical Cell001 to illustrate how these diverse power events and goals are accommodated. The PMD entry for Cell001, which happens to be an input pad, consists of several records whose contents define the cell characteristics described above. This PMD entry first sets out that two timing models ("ism" and "pr") and one power model ("ism") are available for Cell001, where "ism" denotes the time and power models described above, and "pr" is the prior art "propagation ramp" timing model. Next, the sample PMD shows that the cell's logic function is to reflect the signal on the input pin (PAD) at the output pin (CIN), as would be expected for an input pad. The sample PMD also includes miscellaneous information about the cell, including technology (CMOS), feature width (100.8) and height (648.825) and number of transistors (9); and information about the cell's input (PAD) and output (CIN) pins including capacitance (5.160 and 0.094) and identifiers ("Data Input" and "Data Output").

Central to the timing and power models described above, Appendix 1 shows timing characterization data for the two different timing models ("pr" and "ism") in the "timingModel" section. Each model defines timing coefficients for two possible pin-pair transitions at the cell's input PAD and output CIN. tCD_rr defines the coefficients corresponding to a rising input and output and tCD_ff defines the coefficients corresponding to a falling input and output. The "ism" coefficients B, A0 and D0 are identical to the coefficients B, A0, and D0 which are used during characterization to compute the CIR coefficients G and H. The other coefficients (A1 and D1) used to compute the CIR coefficients G and H are easily derived from the "ism" coefficients dA and dD, which correspond to the differences A1–A0 and D1–D0.

The Delay section sets out possible pin-pair transitions, or edges, associated with the delay path from the input pin (pin.PAD) to the output pad (pin.CIN) of Cell001. Here, the possible transitions comprise "rr," a rising edge on the input pin followed by a rising transition on the output pin, and "ff," which involves falling transitions on the input and output pins. The Delay section references the timingModel section so that either the "ism" or the "pr" coefficients can be used to characterize the delays associated with an rr or ff pin-pair transition. Below the Delay section, the MaxRamp time section sets out the maximum input ramps allowed in circuit simulation; here, the figures are 10 microseconds for rising and falling ramps at both the input pin PAD and output pin CIN.

Finally, Appendix 1 shows the PMD dynamic and static power sections, each of which consists of one or more records corresponding to each pin-pair transition (dynamic power records) or state of the cell (static power records). Each of the records consists of two fields. The first field defines the pin-pair transition or state of the cell and involves combinations of three tokens, "when", "rise" and "fall". A "when" field is a string that is a function of the primary input pins and internal states, including "nochange," "stayhigh," "staylow," "notfall" and "not." For example, the expression, "when={staylow IN}", would allow the power simulator 100 to evaluate the power dissipated in a cell when the signal on the input pin (IN) remains low. Dynamic power modelling is made possible by the special functions "rise" and "fall," which respectively indicate a rising or falling voltage signal at one of the cell's pins. For example, in Appendix 1, "rise{CIN, PAD}" tells the power simulator 100 to evaluate the "val" part of the dynamic power record if the voltage signal on the cell's output pin CIN is rising along with the signal on the input pin PAD. All if these tokens can be combined in the same expression; e.g., "Rec rise=pin.A; rise=pin.B; when={not C};", which defines an input condition of the cell where two inputs (A and B) are rising and the third input (C) is low.

The staticPower section of Appendix 1 shows how a "when" term can be used to characterize static power consumed in cell by capturing the cell state rather than input and/or output transitions. Here, the expression "when={not CIN}" defines a state of the cell where the output is not changing.

The "val" field can be one of three types: a real number, a record, or a list of records. When the val field contains a real number, the power pre-computer engine 112 will not have to call any model specific power evaluator to determine the power consumed by a cell instance for a particular pin-pair transition, input slew rate and output load. Instead, the power value that is calculated is simply the value given. This type of value is typically used for static consumption, where the power consumed is due to short circuit and leakage currents that do not depend on a circuit element's input ramp and output load. An example of this type of real number field is shown in the staticPower section of Appendix 1 (i.e., "when={not CIN}; val=0.89; End") which represents that the static power consumed by the cell when the output CIN is low is 0.89 picojoules.

Val records are used to store power coefficients computed during the characterization process. For single-stage cells, as shown in the DynamicPower section of Appendix 1, the coefficients stored in the record are A, B, D, and E which define the present invention's piecewise linear model of power dissipation in single stage devices. For multi-stage cells, the coefficients are AHigh, Bhigh, Dhigh, Alow, Blow and Dlow, which are used to characterize multi-stage devices in the high and low load regions. There is no example of these in Appendix 1 as Cell001 is a single-stage device. These coefficients are passed to the power precomputer along with information from the Netlister 120 regarding the pin loads and ramps of circuit elements copied from the cell library 102, which together allow the precomputer pc to generate power factors for each circuit element for all relevant input waveforms specified in the parent cell's ASW.

A list of records is stored in the PMD val field when the cell has been multiply characterized. For example, a list of records might be used where the cell's power dissipation profile has been approximated by the piecewise linear model of the present invention and by an additional, unspecified polynomial model. In such a case, each record in the list is passed to the power precomputer pc, which computes power factors as usual for specific circuit elements based on input ramp and output loads provided by the Netlister 120.

B. Power Simulation Steps

Figure 5:
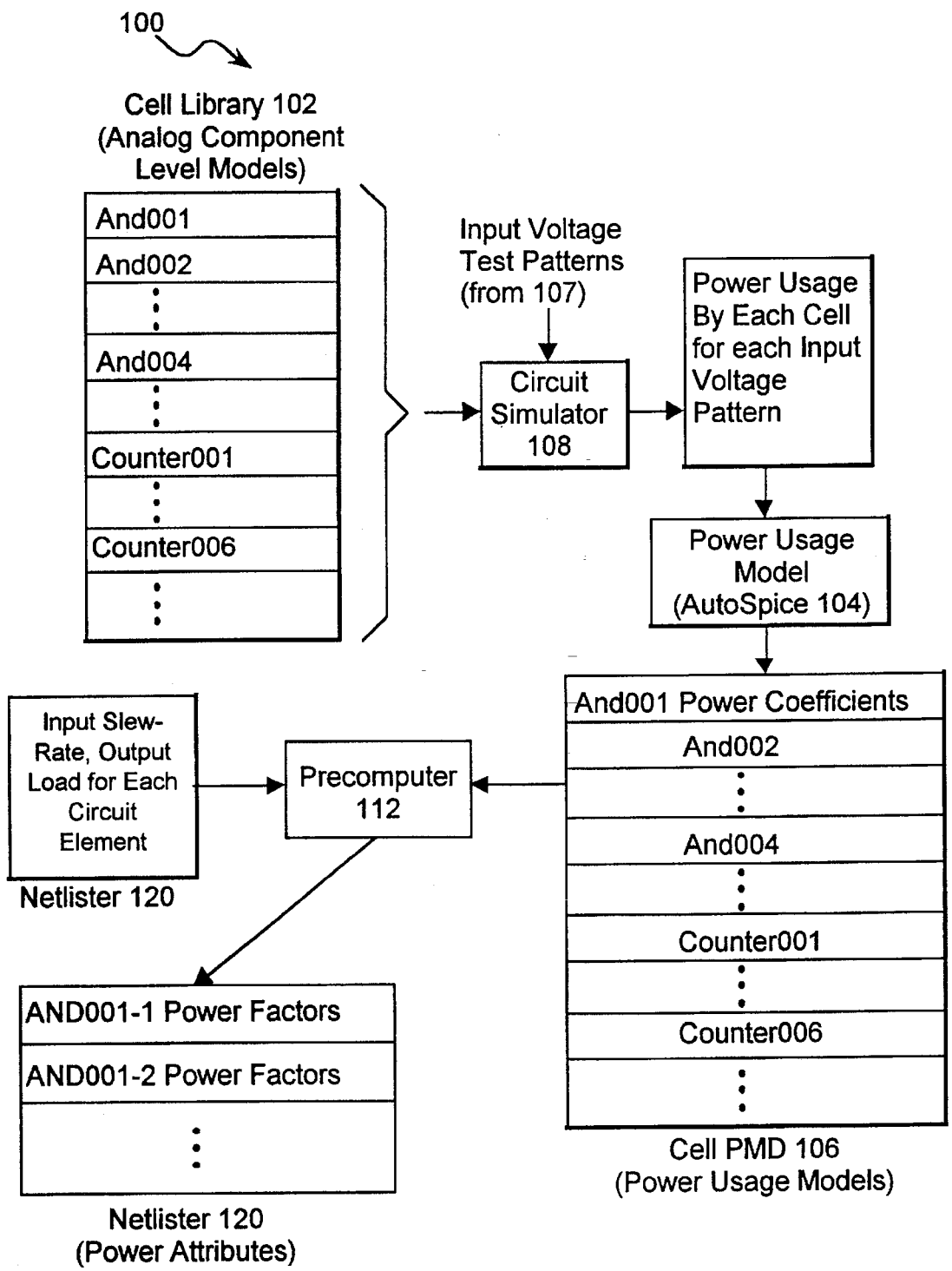
FIG. 5 shows the data flows associated with the cell characterization process.

Referring to FIG. 4 and FIG. 5, in the first step 202 of power simulation, the AutoSpice module 104 extracts from the cell library 102 the transistor-level netlist of a cell to be characterized and downloads the netlist description as a "Spice deck" to the circuit simulator 108, which will model the cell's power consumption in step 204.

In step 204, the circuit simulator 108 determines a cell's power dissipation profile for each input waveform specified by the ASW stored in the cell's PMD entry 106. Each power dissipation profile is defined by a set of dynamic and/or static power consumption measurements modelled by the circuit simulator 108 at different combinations of input ramp (input slew rate) and output load (note: only dynamic power consumption is determined at different input ramps and output loads). The input waveforms as well as the input ramps and output loads are passed to the circuit simulator 108 by AutoSpice 104, which coordinates the characterization process.

Whether determining static or dynamic power consumption, the circuit simulator 108 employs the same power measurement methodology, the basic idea of which is to determine average current drawn by the cell at a steady supply voltage over some predetermined time, then to compute average power as the product of average supply current and supply voltage. Specifically, in the circuit simulator 108 a current monitor is introduced at the supply voltage node of the cell and the average supply current drawn by the cell is measured over the integration period specified in the cell's ASW. These steps are implemented by Spice commands similar to the following example:

MEAS TRAN IDDVAL AVG I(VDD) FROM=8.00 NS TO=23.0 NS

In this Spice command, VDD is the supply voltage, I is the current at the VDD node to be monitored, IDDVAL is the average supply current over the integration period, and the integration period is from 8.0 nanoseconds to 23.0 nanoseconds after the transition being modelled. After determining the average current and knowing the supply voltage, average power is easily computed according to the following equation:

$$P = VDD \cdot IDDVAL \qquad \text{(Eq. 20)}$$

To ensure accurate power characterization, the circuit simulator 108 employs a Spice model of at least level 13, which is able to account for second order effects on power consumption. Additionally, the circuit simulator 108 employs a simulation time step of 0.001 nanoseconds so that IDD current surges, which contribute significantly to power consumption, are detected.

As set out above, the present invention takes into account both the static and dynamic power consumption of logic cells. Two types of signal transitions on a cell's input and output pins causing dynamic power consumption are modelled by the circuit simulator 108: pin-pair transitions, where an input transition is followed by an output transition, and "nochange" transitions, where the input changes but the output doesn't. Note that in the case where an input transition results in multiple output transitions, (e.g., where a clock signal (CLK) input to a flip-flop causes a Q transition and a Qbar transition), that event is characterized as multiple pin-pair transitions (e.g., a CLK-Q pin-pair transition and a CLK-Qbar pin-pair transition). Both types of transitions are discussed above in reference to the structure of the cell PMD 106, and are stimulated by the cell's ASW file entry. Static consumption is not dependent on transitions on a cell's pins, but on internal states of the cell that cause short circuit or leakage current to flow, resulting in significant power consumption. These static events are also accounted for by the ASW, which specifies input voltage patterns that will place the cell into the relevant internal states, and by the PMD power section, which can specify internal states of a cell.

At step 206, AutoSpice 104 characterizes a cell's power dissipation behavior by using the power dissipation profile provided by the circuit simulator 108 to compute power coefficients for each input voltage pattern specified in the cell's ASW. AutoSpice 104 then stores those coefficients in each cell's entry in the PMD 106, where they are indexed by input and output signal and internal cell state, if applicable. These coefficients are the same as those described above in the detailed description of the power model. That is, if the cell is a single-stage device, the AutoSpice module 104 computes the coefficients A, B, D, E and CIR which define the two-part piecewise linear approximation to power consumption in a single-stage device for all input voltage patterns specified in the ASW. If the cell is a multi-stage device, the AutoSpice Module 104 determines the coefficients Alow, Blow and Dlow, and Ahigh, Bhigh and Dhigh, which model the linear approximation to power consumption in multi-stage devices for low and high output loads respectively.

Figure 7:
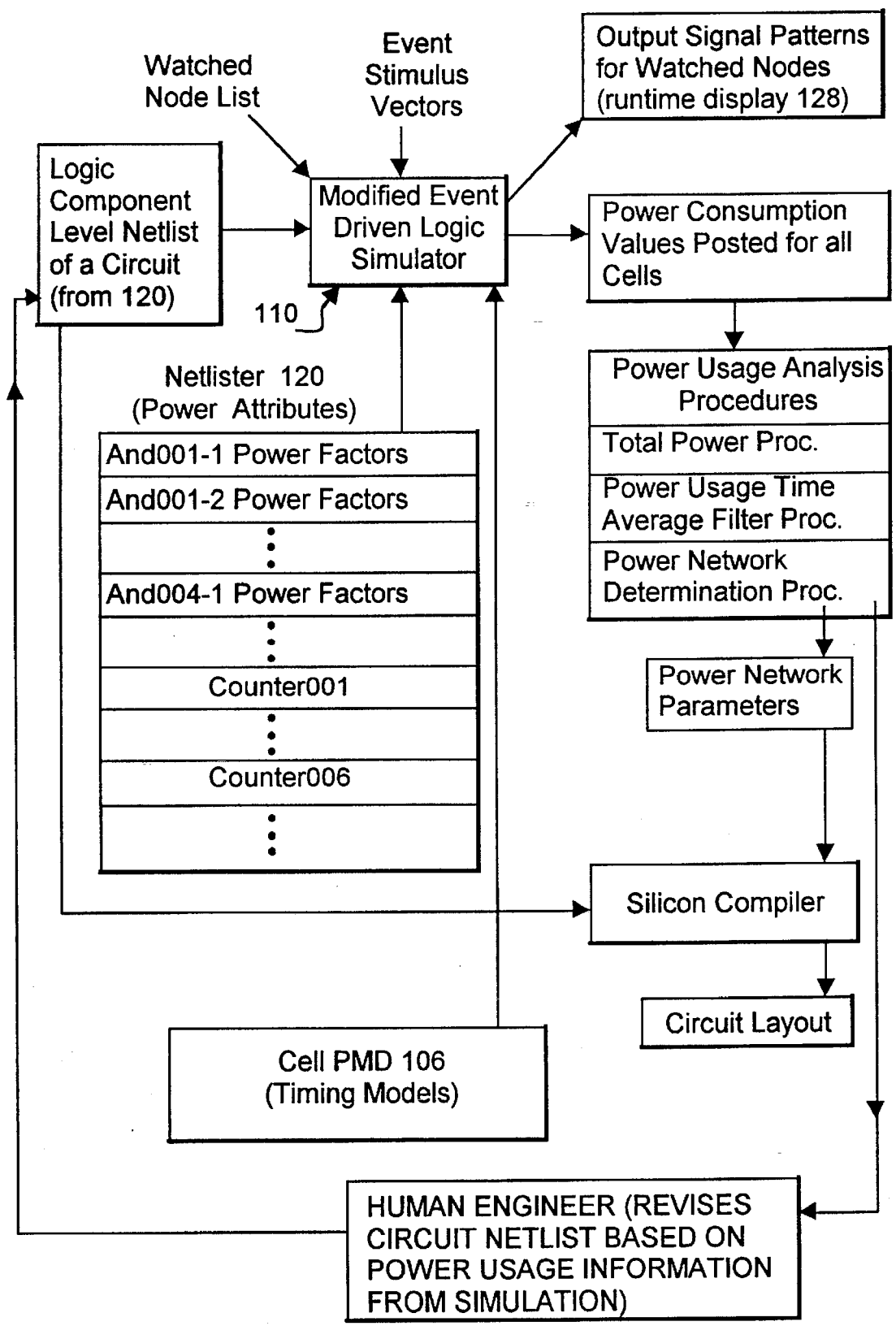
FIG. 7 shows the data flows associated with the circuit power simulation process.

Steps 202, 204 and 206 are repeated for each cell in the cell library 102. When all of the cells in the cell library 102 have been characterized, circuit simulation, represented in FIG. 4 by boxes 208, 210 and 212, may proceed under the control of powerSim 110. An alternative, dataflow view of the simulation process is shown in FIG. 7 and the lower left part of FIG. 5. In the dataflow view of simulation shown on these figures, the precomputer engine 112 combines information on cell instance input slew rates and output loads from the Netlister 120 with cell power coefficients stored in the cell PMD to generate power factors for each circuit element, which are stored back into the Netlister 120. These power factors, a cell level circuit netlist from the Netlister 120, a watched node list, event stimulus vectors, and timing models from the cell PMD 106 are then combined in powerSim 110, a modified event driven logic simulator, which determines power dissipation behavior for the watched nodes and for the circuit as a whole as a result of the events triggered by the event stimulus vectors. The power dissipation of the watched nodes is displayed on the runtime display 128 in a form similar to that shown in FIG.

8. The watched node and other power dissipation data generated by powerSim 110 and written to the binary data file 122 is used to analyze the circuit's power behavior in terms of total, average and peak power consumption, which information is input to a power network determination procedure. The output of the power network determination procedure can be used in two ways. First, as a result of the power network data, a human engineer might modify the cell level netlist of the circuit to improve the circuit's power behavior. Second, after one or more iterations in circuit design and simulation have resulted in satisfactory power performance, power network parameters output by the power network determination procedure may be combined with the cell level circuit netlist from the Netlister 120 in a place and route tool (sometimes called a silicon compiler) to generate a final circuit layout.

The aforementioned dataflow view of simulation is implemented in steps 208, 210 and 212, displayed in FIG. 4. In step 208, the precomputer engine 112, when called by powerSim 110, generates power factors for each circuit element in the circuit to be simulated. A power factor is a measure of the power dissipated by a circuit element as a function of the circuit element's input slew rate and output load for relevant pin-pair transitions and states of the circuit element. To compute the power factors, the precomputer engine 112 first determines the input-slew rate and output load for each cell instance based on cell-level interconnection information obtained from the Netlister 120 via the precomputer interface 114. Next, the precomputer engine 112 passes the input slew rates and output loads to the precomputer pc, which plugs those data into the power equations defined by the power coefficients associated with the cell of which the circuit element is a cell instance for each pin-pair transition and state of the cell.

For example, given an instance of a single-stage cell with input slew rate ir and output load load, two pin-pair transitions, "rise(IN) and fall(OUT)" and "fall(IN) and rise (OUT)", corresponding cell power coefficients A=a1; B=b1; D=d1; E=e1, and A=a2; B=b2; D=d2; E=e2, and corresponding CIR coefficients G=g1; H=h1 and G=g2; H=h2, the power factors PF1 and PF2 are determined by plugging the aforementioned quantities into Eq. 2 and Eq. 1, and computing the power dissipated in the cell instance as follows:

"fall(IN) and rise(OUT)":

$CIR1 = g1 + h1 \times load$
$PF1 = a1 + b1 \times load + d1 \times min(CIR1, ir) + e1 \times max(ir - CIR1)$ "rise(IN) and fall(OUT)":

$CIR2 = g2 + h2 \times load$
$PF2 = a2 + b2 \times load + d2 \times min(CIR2, ir) + e2 \times max(ir - CIR2)$ In some cases, the user may wish to determine the circuit's power consumption for a fabrication process, temperature or power supply voltage different from that used to characterize the cell library represented by the cell power coefficients in the cell PMD 106. Thus, at the beginning of power simulation the user can specify the environmental conditions (i.e., process, temperature, power supply voltage) for the simulation, then the precomputer scales the power factors computed as set out above by factors related to the difference between the environment used to characterize the library and the environment used for the simulation. These environmental factors can also be taken into account by the precomputer pc before simulation by computing different PMD power sections for predetermined temperatures, powers, and processes.

The precomputation step 208 is completed when the precomputer engine 112 stores the computed power factors, or scaled power factors, into a separate power section in the Netlister 120, where they are indexed by cell instance, pin-pair transition and state. The power factors stored in the Netlister 120 are accessible to powerSim 110, which employs those figures to compute power consumption in the cell instances during the course of power simulation.

Once the precomputation step 208 is complete, the powerSim 110 loads the logic-level netlist parsed for power factors from the Netlister 120, then calls the power module 116, which creates a hierarchical data structure 250 consisting of a linked list of blocks and sub-blocks, shown in FIG. 6 as BIk001 through BIkN and SBIk001 through SBIkN respectively. The hierarchical data structure 250 forms a representation of the simulated netlist that retains circuit interconnection information and allows power consumption in the entire circuit, blocks, sub-blocks, chip core or padring, or individual circuit elements or cell instances to be monitored throughout circuit simulation. The lowest level of the hierarchical data structure 250 is composed of "leaf cells," shown in FIG. 6 as LeafCell001 through LeafCellN, corresponding to circuit elements, which determine the power consumed in each circuit element or cell instance in the course of the power simulation. Each of these leaf cells also contains an instance record that stores the power factors for that instance that were passed to the powerSim module 110 by the Netlister 120 during netlist loading. Blocks and sub-blocks are collections of cell instances and other sub-blocks that correspond to macros and other circuit devices blocks that are defined during circuit layout by the circuit designer and are represented in the circuit netlist. The top level block, designated TLB in FIG. 6, represents the highest level of the hierarchical ASIC design. A typical block might correspond to large circuits such as an arithmetic logic unit (ALU) or a content addressable memory (CAM), each of which is composed of additional sub-blocks. For example, the ALU might include sub-blocks corresponding to a fixed point unit and a math coprocessor for floating point calculations.

Following initialization 208, powerSim 110 begins the event-driven logic simulation of the circuit designated in FIG. 4 as step 210. During the simulation step 210, a set of event stimulus vectors input to the powerSim 100 are played by the powerSim at time intervals set by the system clock. The events triggered by the event stimulus vectors result in power consumption by the circuit elements. The power consumed by the various circuit elements during simulation is tracked by powerSim 110 at intervals defined by a power clock whose period is set by a user of the power simulator 100 and can vary from that of the system clock. A clock with a shorter period than the system clock can be employed when power consumption at a multi-clocked node of a circuit element is being investigated or when power at separate nodes of a multi-staged combinatorial circuit is of interest. The power clock can be set to a longer period than the system clock when average power consumption figures are of interest. In addition to input waveforms for stimulating logic transitions, the event stimulus vectors input to powerSim 110 can include commands to watch ("watchP") or unwatch ("unwatchP") the power consumed in one or more cell instances or to turn off ("PowerOff") or on ("Power on") power to a part or all of the circuit. Additionally, powerSim 110 accommodates wildcards in instance name specification so that, for example, all And gates of type And001 in the circuit may be watched by simply specifying "watchP(And001*)", where the "*" denotes a wildcard that matches the end of any cell instance name beginning with "And001". So, given the watch command watchP(And001*) and the cell instances listed in FIGS. 4 and 6–8, the cell instances And001-1 and And001-2 would be placed on the watched list.

On every edge of the power clock, powerSim 110 tracks activity on each input pin of each circuit element as a result of which leaf cells are called. In step 212, the leaf cells, denoted as model instances 117 in FIG. 1 and FIG. 7 and represented as LeafCell001, LeafCell002, and LeafCellN in FIG. 6, determine the type of transition on their input pins and, using the corresponding power factors in their instance record, update their dynamic and static power buckets, shown in FIG. 6 as "spb" and "dpb." If a cell does not experience an input transition as a result of a simulated event but is in an internal state that results in static power consumption, that cell's static power consumption must also be determined for each power clock. The static power consumed by a circuit element is represented by a string expression from the corresponding entry in the cell PMD 106 (see Appendix 1 and the discussion of the PMD above). To compute static power consumption, the model instances 117 parse the "when" string from the PMD 106, and, if the "when" string matches the present state of the leaf cell, then the corresponding power factor represented in the "val" string is accumulated into the instance record's static power bucket. Note that, regardless of whether a cell is activated during an input transition, static power consumption is determined only if the cell's PMD entry contains the static power terms. When static power terms are present in the PMD, the model instances 117 compute the instance's static power dissipation based on the static power value in the corresponding PMD entry and the amount of time the instance has been in the static-power consuming state.

After the dynamic dpb and static spb power buckets are updated, the model instances 117 update the global static 256 and dynamic 258 power buckets, shown in FIG. 6, to reflect the power consumed in each of the instances 117 for that power cycle.

At each edge of the power clock and after the model instances 117 have updated the leaf cell and global power buckets 256 and 258, the powerSim 110 calls the power module 116, which tracks and displays the power consumed in the entire circuit, watched cell instances and nodes since the last power clock, computes the power consumed due to power glitches, reports the power consumed in the chip pad ring and core, and performs housekeeping duties on the hierarchical circuit data structure. In general, power consumption figures computed for each power clock cycle are divided by an appropriately-scaled power clock cycle duration, yielding power usage rates in the desired units, which are reported on the displays 126 and/or 128. For example, in the preferred embodiment of the present invention, powers in picojoules are divided by cycle time in microseconds, then those values are reported as microwatts as is shown in FIG. 3. The data passed to the power module 116 by the powerSim 110 includes a watched nodes list, which indicates the circuit elements for which power is to be reported for the current power cycle, and a pointer to the instance-specific records containing power data associated with the leaf cells.

When called by the powerSim 110, the power module traverses the hierarchical data structure 250 shown in FIG. 6, accumulating and displaying static, dynamic and total power dissipated in the watched instances based on the contents of watched leaf cell dynamic and static power buckets dpb and spb; total power consumed by each watched instance 117 is stored in the leaf cell total power buckets tpb. The power module 116 also displays on the runtime display 128 the static, dynamic and total power consumed at watched nodes (including subblocks SBIk and blocks BIk shown in FIG. 6), which is determined by accumulating power from the leaf cells that constitute each subblock or block into the appropriate static and dynamic power buckets spb and dpb according to the hierarchical data structure 250. Note that static and dynamic power buckets are allocated in memory only for watched subblocks and blocks; as a result, power consumed by other blocks and subblocks can only be recovered from the binary data file 122 during post-processing 124. After determining power consumption due to the watched cell instances, the power module 116 retrieves the glitch count maintained by the powerSim 110 for the current power cycle, multiplies the number of glitches by a factor for power dissipation per glitch, and subtracts the resulting glitch power consumption figure to the global dynamic power bucket. Glitch power is subtracted instead of added due to the nature of the simulation process.

A glitch occurs when a pulse has a duration less than the minimum pulse width or when an input signal does not fully transition to the high or low voltage level. The simulator, being event-driven, cannot know beforehand when a transition might result in a glitch. Instead, the simulator calls the power module 116 when it sees the starting edge of a transition, thereby causing the power module 116 to dissipate power, regardless of whether the transition turned out to be normal or a glitch. It is only after the fact that the simulator establishes that the transition was really a glitch. By then it is too late for the power module to rectify the situation by subtracting the power dissipated. Hence, at the end of simulation, a correction for the overconsumption of power is provided based, in a simple version of the glitch model, on the glitch count maintained by powerSim 110.

A more complex and accurate alternative glitch model is provided which models the power dissipated into glitches as a function of output load and duration of the glitch pulse. In this model glitch durations are stored in instance records at the end of each power clock cycle where they are accessible to the power module 116, which can dynamically compute power dissipated into glitches. With this model, glitch power is determined within 20% of Spice, a dramatic improvement over ad hoc approaches found in the literature which can be off by up to 200%. In another alternative glitch model, glitch power counts are reported for each power cycle rather than at the end of simulation so the distribution of glitches can be reported during rather than at the end of simulation. Such a report helps the designer to determine whether the level of hazards in the circuit are within allowed tolerances.

Following subtraction of the glitch power from the global dynamic power bucket 258, the static, dynamic and total global power dissipated in the chip is reported as a histogram via the runtime display 128. An example of a typical power histogram display is shown in FIG. 8, which shows the power dissipated in a hypothetical watched block BIkA at intervals corresponding to the power clock PwrClk, in response to input signals Data and a system clock Clk that has a period longer than that of the power clock PwrClk. Note that, because the powerSim 110 does not track glitches on each and every node, but only global totals, power dissipation in the watched instances due to power glitches is not reflected on the runtime display 128 of dynamic and total power for the watched instances and nodes.

The power module 116 also determines and separately reports and displays power loss in the chip core and pad-ring which compose another level of the hierarchical circuit data structure 250. These values are presented on the display 128 as summaries, not histograms, as providing additional power buckets for the pad-ring and core could result in data overflow. The power module 116 writes a compressed binary log file 122 that summarizes power dissipation in each leaf cell and the circuit as a whole over the current power clock period. This binary file 122 is used by the post-processor 124, which can recover and show on the analysis display 126 power consumed at any level of the circuit, whether or not the leaf cell or node at some other hierarchical level was on the simulation watch list. After writing the binary file 122, the power module 116 adds the values in the global static and dynamic power buckets 256 and 258 to the alltime static and dynamic power buckets 252 and 254 and accumulates the global power figures into the alltime total power bucket 255. After accumulating alltime power figures, the power module 116 resets the global power buckets 256 and 258 and leaf static and dynamic power buckets. Finally, the power module 116 creates a trace file detailing the logic performance of watched nodes during the power simulation run.

Additionally, the present invention supports analysis of power consumption in circuits that employ power bus gating to reduce power usage. In such systems, circuit blocks are powered off in response to the occurrence of a predefined logic signal (e.g., a signal that indicates that an on-chip math coprocessor is to be disabled). In the power simulator 100, such events can be accounted for by conditional "watch" or "unwatch" commands as shown below:

unWatchPower u2.u3 (if u1.cdn=L AND u1.sdn=L).

In this example, power consumption in a node "u3," which is a constituent of a node "u2," is unwatched if two signals of a node "u1" ("cdn" and "sdn") are Low. Similar commands can be constructed to conditionally start watching power consumption in a node. Thus, when a block is powered off due to power bus gating, the condition on that block's conditional "unwatch" command is met and the "unwatch" command is issued for that block. As a result, power consumption by that block, or the block's constituent sub-blocks and leaf cells, is not accumulated or reported, even if that block would have consumed power in the course of a simulated event. The block remains unwatched until the signal condition on the corresponding conditional "watch" command is met, upon which occurrence the power simulator issues "watch" commands to once again begin accumulating and reporting power consumed in the block and the block's constituent leaf cells and sub-blocks. Consequently, different power bus gating approaches can be evaluated in the present power simulator.

In another preferred embodiment of the present invention, the global power buckets 256 and 258 reflect only the power dissipated in watched instances or instances that are constituents of watched nodes at higher hierarchical levels of the circuit. This saves the time required by the power module 116 to traverse the entire hierarchical data structure 250, accumulating total chip power, when only the power consumed by a block or subblock is of interest. In this embodiment, it should be apparent that the alltime power buckets 254, 252 and 255 will reflect only the power consumed in the watched entities. In addition, in this embodiment, only watched-leaf power buckets are reset as unwatched-leaf power buckets do not accumulate power at the leaf cell level.

In yet another preferred embodiment, the power module 116 writes only the power consumed by watched instances or by instances constituting watched nodes into the binary log file 122. As with the above embodiment, this saves time required by the power module 116 to write to the file 122 the power consumed in all of the leaf cells, when only a subset of leaf cells that make up a block or subblock are of interest. Ideally, these alternate preferred embodiments are employed together as user-selectable options.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

APPENDIX 1

```
Function
   (timing model = oneOf ("ism", "pr");
   powerModel = oneOf("ism"); )
Rec
   Logic = Function (PAD; )Rec CIN = PAD; End End;
   miscInfo = Rec
      iconParameter = "pinNumber";
      TITLE = "5V Input Only with Pull-up";
      ioPads = 1;
      productName = "Cell001";
      Width = 100.8;
      Height = 648.825;
      Transistors = 9;
   End;
   Pin = Rec
      PAD = Rec input; pullup; pad; cap = 5.160;
         doc = "Data Input"; End;
      CIN = Rec
         output;
         cap = 0.094;
         doc = "Data Output";
      End;
   End;
   Symbol = Select
      timingModel
      On pr Do Rec
         tCD_rr = (Rec prop = 0.137; ramp = 0.270;
            End);
         tCD_ff = (Rec prop = 0.161; ramp = 0.288
            End;);
      End;
      On ism Do Rec
         tCD_rr = (
            Rec
               wavename = "inlhc";
               B = 0.5812;
               A0 = 0.0935;
               dA = 0.0499;
               D0 = -0.0194;
               dD = 0.4453;
               caps = ();
               origCaps = 0.9280, 1.8560));
            End;
         );
         tCD_ff = (
            Rec
               wavename = "inhlc";
               B = 0.6175;
               A0 = 0.1074;
               A1 = 0.0446;
               D0 = -0.0066;
               D1 = 0.4531;
               caps = ();
               origCaps = (( 0.9280, 1.8560));
            End;
         );
      End
   End;
   Delay = (
      Rec
         from = pin.PAD;
```

APPENDIX 1-continued

```
          to = pin.CIN;
          edges = Rec           rr = Symbol.tCD__rr;
                                ff = Symbol.tCD__ff; End;
     End;
     MaxRampTime = (
          Rec check = pin.PAD;   riseTime = 10.000;
                                 fallTime = 10.000; End;
          Rec check = pin.CIN;   riseTime = 10.000;
                                 fallTime = 10.000; End;
     );
     DynamicPower = (
          Rec rise = {CIN, PAD};
               val = (Rec fromPIN = pin.PAD;
                     toPin = pin.CIN; edge="rr";
                     A = 0.23; B = .45; D = .45;
                     E = .67;
                     End,
                    );
          End
          Rec fall = {CIN, PAD};
               val = (Rec fromPIN = pin.PAD;
                     toPin = pin.CIN; edge="ff";
                     A = 0.23; B = .45; D = .45;
                     E = .67;
                     End,
                    );
          End
     );
     StaticPower = (
          Rec when = {not CIN}; val = 0.89; End,
     );
     End
End
```

What is claimed is:

1. A method for simulating power consumption of an electronic circuit having a plurality of circuit elements, where each said circuit element is an instance of a library cell selected from a predefined set of library cells, said method comprising the steps of:

(a) providing a transistor-level netlist of a cell to be characterized, said cell having an input and an output, said cell comprising one of said set of library cells;

(b) determining a power dissipation profile for said cell by modelling at said transistor-level power dissipated by said cell in response to input waveforms applied to said input of said cell for a plurality of input slew rate and output load combinations, wherein said input slew rate is a signal transition rate associated with said input waveforms and said output load is a capacitive load driven from said output; said determining step including, when said cell is capable of assuming more than one internal logic state, a plurality of power dissipation profiles corresponding to a plurality of internal logic states for said cell;

(c) characterizing each said power dissipation profile for said cell with a plurality of power coefficients representing power dissipation for said cell as function of said slew rate and said output load;

(d) executing steps (a)–(c) for each of said cells comprising said circuit;

(e) precomputing for each circuit element an input slew rate and an output load;

(f) precomputing for each circuit element a power factor corresponding to each of said power dissipation profiles for the library cell corresponding to said each circuit element, each said power factor being computed as a function of said power coefficients for the corresponding power dissipation profile, said precomputed input slew rate and said precomputed output load;

(g) simulating the logic and timing behavior of said circuit for a specified time period so as to generate data representing simulated signal transitions at computed times in said circuit;

(h) for each said simulated signal transition, storing a power factor for each circuit element, if any, that receives said simulated signal transition, wherein the power factor stored is the one of said precomputed power factors for said circuit element corresponding to said circuit element's simulated state, if any, just prior to said simulated signal transition;

wherein said characterization of said cell constituted as a single-stage device further comprises the steps of:

(i) measuring a first power (P1) corresponding to a first input ramp (IR1) in a fast ramp region and a first output load (LOAD1) in a low load region, wherein said fast ramp region defines a part of said power dissipation profile where, for a constant output load, power dissipated by said cell is relatively independent of input ramp;

(j) measuring a second power (P2) corresponding to a second input ramp (IR2) in said fast ramp region and said first output load (LOAD1);

(k) measuring a third power (P3) corresponding to said first input ramp (IR1) and a second output load (LOAD2) in a high load region;

(l) measuring a fourth power (P4) corresponding to a fourth input ramp (IR4) from a slow ramp region and an output load in said low load region, wherein said slow ramp region defines a part of said power dissipation profile where, for a constant output load, power dissipated by said cell increases as said input ramp increases;

(m) determining a critical input ramp (CIR) for said power dissipation profile, where said CIR is a curve separating said fast ramp and said slow ramp regions of said power dissipation probe;

(n) computing a first coefficient (D) as follows:
D=(P2–P1)/(IR2–IR1);

(o) computing a second coefficient (B) as follows:
B=(P3–P1)/(LOAD3–LOAD1):

(p) computing a third coefficient (A) as follows:
A=P3–B*LOAD3–D*IR1: and (q) computing a fourth coefficient (E) as follows:
E=((P4–P1)–D*CIR)/(IR4–CIR)

such that, given an input ramp, an output load: and a state of said cell, a measure of dynamic and static power dissipated by said cell as a result of a pin-pair transition on said input and said output of said cell can be determined according to the following formula:

$$P=A+B*LOAD+D*min(IR, CIR)+E*max(0,IR-CIR),$$

which approximates said power dissipation profile in a piecewise linear fashion, said approximation consisting of a first line segment having a first slope defining said fast ramp region and a second line segment having a second slope defining said slow ramp region, said first line segment and said second line segment intersecting at a single point located on said CIR.

2. The method of claim 1 wherein said critical input ramp (CIR) for said power dissipation profile is identical to a critical input ramp (TCIR) for the timing behavior of said cell determined during a delay simulation of said cell, said TCIR being defined as ½(DT0+DT1), where DT0 is a linear function representing time measured during said delay simulation between a signal transition beginning at said input of said cell and a signal transition beginning at said output of said cell, and DT1 is a different linear function representing time measured during said delay simulation between a signal transition beginning at said input of said cell and a signal transition ending at said output of said cell, said DT0 and DT1 intersecting at said single point.

3. The method of claim 1, further including:
 (a) specifying a sequence of time periods;
 (b) accumulating said power factors stored for each time period in said sequence of time periods so as to generate a total power dissipation factor for each said time period; and
 (c) generating a representation of power dissipation by said electronic circuit for each said time period.

4. The method from claim 1 wherein said power dissipation profiles reflect dynamic and static power dissipation of said cell to be characterized.

5. The method of claim 1 wherein said power dissipated in said electronic circuit is stored in such a manner that static and dynamic power dissipated by instances, static and dynamic power dissipated in the entire circuit, and power dissipated in various blocks, subblocks or other designated regions of said circuit can be reported for each computed time period.

6. A method for simulating power consumption of an electronic circuit having a plurality of circuit elements, where each said circuit element is an instance of a library cell selected from a predefined set of library cells, said method comprising the steps of:
 (a) providing a transistor-level netlist of a cell to be characterized, said cell having an input and an output, said cell comprising one of said set of library cells;
 (b) determining a power dissipation profile for said cell by modelling at said transistor-level power dissipated by said cell in response to input waveforms applied to said input of said cell for a plurality of input slew rate and output load combinations, wherein said input slew rate is a signal transition rate associated with said input waveforms and said output load is a capacitive load driven from said output; said determining step including, when said cell is capable of assuming more than one internal logic state, a plurality of power dissipation profiles corresponding to a plurality of internal logic states for said cell;
 (c) characterizing each said power dissipation profile for said cell with a plurality of power coefficients representing power dissipation for said cell as function of said input slew rate and said output load, said power coefficients defining a piecewise linear approximation of said power dissipation profile, said approximation consisting of at least two line segments having slopes relating dissipated power to output load and input slew rate, adjacent pairs of said line segments meeting at a single point located on a critical input ramp (CIR) for said power dissipation profile that is identical to a critical input ramp (TCIR) for the timing behavior of said cell determined during a delay simulation of said cell, said TCIR being defined as ½(DT0+DT1), where DT0 is a linear function representing time measured between a signal transition beginning at said input of said cell and a signal transition beginning at said output of said cell, and DT1 is a different linear function representing time measured between a signal transition beginning at said input of said cell and a signal transition ending at said output of said cell, said DT0 and DT1 intersecting at said single point;
 (d) executing steps (a)–(c) for each of said cells comprising said circuit;
 (e) precomputing for each circuit element an input slew rate and an output load;
 (f) precomputing for each circuit element a power factor corresponding to each of said power dissipation profiles for the library cell corresponding to said each circuit element, each said power factor being computed as a function of said power coefficients for the corresponding power dissipation profile, said precomputed input slew rate and said precomputed output load;
 (g) simulating the logic and timing behavior of said circuit so as to generate data representing simulated signal transitions in said circuit;
 (h) for each said simulated signal transition, storing a power factor for each circuit element, if any, that receives said simulated signal transition, wherein the power factor stored is the one of said precomputed power factors for said circuit element corresponding to said circuit element's simulated state, if any, just prior to said simulated signal transition.

7. The method of claim 1 or 6 wherein, when said cell is a multi-stage device, said power dissipation profile of said cell is approximated as a linear function.

8. A power simulator to simulate power consumption behavior of an electronic circuit having a plurality of instances copied from a library of cells, said simulator comprising:
 (a) a physical design tool to provide a transistor-level description of a cell to be characterized, said cell having an input and an output;
 (b) a circuit simulator to determine a power dissipation profile for said cell based on said cell's transistor-level description by modelling at said transistor-level power dissipated by said cell in response to input waveforms applied to said input of said cell for a plurality of input ramp and output load combinations, wherein said input ramp is a slew rate associated with said input waveforms and said output load is a capacitive load driven from said output;
 (c) a characterization routine to generate a plurality of power coefficients that model said cell's power dissipation profile as a function of input-output transitions and states of said cell, wherein said input-output transitions and said states are a byproduct of said input waveforms, said power coefficients defining a piecewise linear approximation of said power dissipation profile, said approximation consisting of at least two line segments having slopes relating dissipated power to output load and input slew rate, adjacent pairs of said line elements meeting at a single point located on a critical input ramp (CIR) for said power dissipation profile that is identical to a critical input ramp (TCIR) for the timing behavior of said cell determined during a delay simulation of said cell, said TCIR being defined as ½(DT0+DT1), where DT0 is a linear function representing time measured between a signal transition beginning at said input of said cell and a signal transition beginning at said output of said cell, and DT1 is a different linear function representing time measured between a signal transition beginning at said input of said cell and a signal transition ending at said output of said cell, said DT0 and DT1 intersecting at said single point;
 (d) a netlister to determine for each instance an instance input ramp and an instance output load based on a logic device level netlist of said electronic circuit;

(e) a precomputer to compute for each instance power factors relating power dissipation in said instance to said input-output transitions and said states of said instance, wherein said power factors are based on said power coefficients of a cell from which said instance was copied and said instance input ramp and said instance output load;

(f) an event driven logic simulator to simulate the logic and timing behavior of said circuit in response to event stimulus vectors and generate data representing simulated signal transitions at computed times in said circuit;

(g) a power module to store for each simulated signal transition a power factor for each instance, if any, that receives said simulated signal transition, wherein the power factor stored is one of said precomputed power factors for said circuit element corresponding to said circuit element's simulated state, if any, just prior to said simulated signal transition.

9. The method of claim 8 wherein said cell power coefficients are generated by a selectable power precomputer.

10. A method for simulating power consumption of an electronic circuit having a plurality of circuit elements, where each said circuit element is an instance of a library cell selected from a predefined set of library cells, said method comprising the steps of:

(a) providing a transistor-level netlist of a cell to be characterized, said cell having an input and an output, said cell comprising one of said set of library cells;

(b) determining a power dissipation profile for said cell by modelling at said transistor-level power dissipated by said cell in response to input waveforms applied to said input of said cell for a plurality of input slew rate and output load combinations, wherein said input slew rate is a signal transition rate associated with said input waveforms and said output load is a capacitive load driven from said output; said determining step including, when said cell is capable of assuming more than one internal logic state, a plurality of power dissipation profiles corresponding to a plurality of internal logic states for said cell;

(c) characterizing each said power dissipation profile for said cell with a plurality of power coefficients representing power dissipation for said cell as function of said slew rate and said output load;

(d) executing steps (a)–(c) for each of said cells comprising said circuit;

(e) precomputing for each circuit element an input slew rate and an output load;

(f) precomputing for each circuit element a power factor corresponding to each of said power dissipation profiles for the library cell corresponding to said each circuit element, each said power factor being computed as a function of said power coefficients for the corresponding power dissipation profile, said precomputed input slew rate and said precomputed output load;

(g) simulating the logic and timing behavior of said circuit for a specified time period so as to generate data representing simulated signal transitions at computed times in said circuit;

(h) for each said simulated signal transition, storing a power factor for each circuit element, if any, that receives said simulated signal transition, wherein the power factor stored is the one of said precomputed power factors for said circuit element corresponding to said circuit element's simulated state, if any, just prior to said simulated signal transition;

wherein said characterization of said cell constituted as a multi-stage device comprises the steps of:

(i) measuring a fifth power (P5) corresponding to a fifth input ramp (IR5) in a fast ramp region and a fifth output load (LOAD5) in a high load region, wherein said fast ramp region defines a part of said power dissipation profile where, for a constant output load, power dissipated by said cell is relatively independent of input ramp;

(j) measuring a sixth power (P6) corresponding to a sixth input ramp (IR2) different from said fifth input ramp (IR5) and a sixth output load (LOAD6) in a high load region;

(k) measuring a seventh power (P7) corresponding to said sixth input ramp (IR6) and said fifth output (LOAD5);

(l) creating a system of three equations in three variables by substituting triplets (P5, IR5, LOAD5), (P6, IR2, LOAD6), and (P7, IR6, LOAD5) into an equation defining power dissipation of a multi-stage cell in the high load region, said high load equation given by the expression P=Ahigh+Bhigh*IR+Dhigh*LOAD, said triplets being substituted for the variables P, IR and LOAD; and (m) solving said system of three equations in three variables for said high load power coefficients, Ahigh, Bhigh and Dhigh;

(n) measuring an eighth power (P8) corresponding to said sixth input ramp (IR6) in a fast ramp region and an eighth output load (LOAD8) in a low load region;

(o) measuring a ninth power (P9) corresponding to said fifth input ramp (IR5) and a ninth output (LOAD9) in a low load region;

(p) measuring a tenth power (P10) corresponding to said sixth input ramp (IR6) and said ninth output load (LOAD9);

(q) creating a system of three equations in three variables by substituting triplets (P8, IR6, LOAD8), (P9, IR5, LOAD9), and (P10, IR6, LOAD9) into an equation defining power dissipation of a multi-stage cell in the low load region, said low load equation being given by the expression P=Alow+Blow*IR+Dlow*LOAD, said triplets being substituted for the variables P, IR and LOAD; and (r) solving said system of three equations in three variables for said low load power coefficients, Alow, Blow and Dlow;

such that, given an input ramp, an output load, and a state of said cell, a measure of dynamic and static power dissipated by said cell as a result of a pin-pair transition on said input and said output of said cell can be determined according to the formula P=Ahigh+Bhigh*LOAD+Dhigh*IR, if said output load is in said high load region; and according to the formula P=Alow+Blow*LOAD+Dlow*IR, if said output load is in said low load region, said equations each approximating said power dissipation profile as a single line.

11. The method of claim 10, further including:

(a) specifying a sequence of time periods;

(b) accumulating said power factors stored for each time period in said sequence of time periods so as to generate a total power dissipation factor for each said time period; and (c) generating a representation of power dissipation by said electronic circuit for each said time period.

12. The method of claim 10 wherein said power dissipation profiles reflect dynamic and static power dissipation of said cell to be characterized.

13. The method of claim 10 wherein said power dissipated in said electronic circuit is stored in such a manner that static and dynamic power dissipated by instances, static and dynamic power dissipated in the entire circuit, and power dissipated in various blocks, subblocks or other designated regions of said circuit can be reported for each computed time period.

* * * * *